United States Patent
Cardona-Gonzalez et al.

(10) Patent No.: US 10,594,801 B2
(45) Date of Patent: Mar. 17, 2020

(54) VIRTUAL HOSTING DEVICE AND SERVICE TO PROVIDE SOFTWARE-DEFINED NETWORKS IN A CLOUD ENVIRONMENT

(71) Applicant: PUREPORT, INC., Raleigh, NC (US)

(72) Inventors: Lee Cardona-Gonzalez, New Cumberland, PA (US); Robert E. Pulley, Aptos, CA (US); Patrick D. Riley, Ridgefield, CT (US)

(73) Assignee: Pureport, Inc., Raleigh, NC (US)

( * ) Notice: Subject to any disclaimer, the term of this patent is extended or adjusted under 35 U.S.C. 154(b) by 386 days.

(21) Appl. No.: 15/352,394

(22) Filed: Nov. 15, 2016

(65) Prior Publication Data

US 2017/0070580 A1 Mar. 9, 2017

Related U.S. Application Data

(63) Continuation of application No. 14/494,243, filed on Sep. 23, 2014, now Pat. No. 9,531,814.

(51) Int. Cl.
*H04L 29/08* (2006.01)
*H04W 4/60* (2018.01)

(52) U.S. Cl.
CPC ............ *H04L 67/141* (2013.01); *H04L 67/10* (2013.01); *H04L 67/18* (2013.01); *H04W 4/60* (2018.02)

(58) Field of Classification Search
CPC ...................................................... H04W 4/60
See application file for complete search history.

(56) References Cited

U.S. PATENT DOCUMENTS

| | | | |
|---|---|---|---|
| 8,667,057 B1 | 3/2014 | Adya et al. | |
| 8,782,637 B2 | 7/2014 | Khalid | |
| 9,531,814 B2 * | 12/2016 | Cardona-Gonzalez | ..................... H04L 67/141 |
| 2011/0265164 A1 | 10/2011 | Lucovsky et al. | |
| 2012/0030672 A1 | 2/2012 | Zygmuntowicz et al. | |
| 2013/0204849 A1 | 8/2013 | Chacko | |
| 2013/0211870 A1 | 8/2013 | Lawson et al. | |
| 2013/0212129 A1 | 8/2013 | Lawson et al. | |
| 2013/0304903 A1 * | 11/2013 | Mick | ................... H04L 43/0817 709/224 |
| 2013/0339949 A1 * | 12/2013 | Spiers | ................. G06F 9/45558 718/1 |

(Continued)

*Primary Examiner* — Nicholas P Celani
(74) *Attorney, Agent, or Firm* — DLA Piper LLP (US)

(57) ABSTRACT

A hosting system to facilitate a customer of an operator of the system to connect to a cloud provider, the system including: a first cloud exchange co-located with and connected to first cloud provider equipment; a second cloud exchange co-located with and connected to second cloud provider equipment, wherein the first cloud provider equipment and the second cloud provider equipment are of a same cloud provider but at different geographically spaced locations or the first cloud provider equipment is of a different cloud provider than that of the second cloud provider equipment, and wherein the first cloud exchange is connected to the second cloud exchange; and a non-transitory computer readable medium including computer program instructions, the instructions configured to facilitate the configuration of a software-defined network including the first cloud exchange and/or second cloud exchange, wherein the network connects the customer to the first cloud provider equipment and/or the second cloud provider equipment.

20 Claims, 28 Drawing Sheets

(56) References Cited

U.S. PATENT DOCUMENTS

| | | |
|---|---|---|
| 2014/0006354 A1 | 1/2014 | Parkison et al. |
| 2014/0040979 A1 | 2/2014 | Barton et al. |
| 2014/0059665 A1 | 2/2014 | Albani |
| 2014/0114918 A1 | 4/2014 | Babich et al. |
| 2014/0310513 A1 | 10/2014 | Barney et al. |
| 2014/0336795 A1 | 11/2014 | Asenjo et al. |
| 2014/0337086 A1 | 11/2014 | Asenjo et al. |

* cited by examiner

VIRTUAL HOSTING DEVICE AND SERVICE TO PROVIDE SOFTWARE-DEFINED NETWORKS IN A CLOUD ENVIRONMENT

This application is a continuation of U.S. patent application Ser. No. 14/494,243, filed on Sep. 23, 2014, which is incorporated herein in its entirety by reference.

BACKGROUND

Cloud computing environments have revolutionized the manner in which business organizations examine the requirements and capacity to implement their data processing needs. A cloud computing environment may allow a cloud provider to host hardware and related items and provide systems and computational power as a service to a customer or other user (e.g., individual consumers, business organizations, or other entities). Thus, when implementing data processing needs via a cloud vendor, a user may avoid the direct cost of space, energy, and maintenance in order to acquire computational resources.

BRIEF SUMMARY

Systems and methods to facilitate customers to configure a network to connect to one or more cloud providers are disclosed. In some implementations, the system may comprise one or more Cloud Points of Presence (PoPs) and one or more Cloud Exchanges interconnected with each other through a high performance fiber-optic cable backbone. A Cloud PoP may host a container based virtual access gateway, which a customer may use to connect to the system. A Cloud Exchange may host a container based virtual cloud gateway, which may interface with one or more cloud providers. In some implementations, one or more Cloud PoPs and/or one or more Cloud Exchanges may host a container based virtual network controller. A customer may deploy an access gateway, a cloud gateway and a network controller to easily define a software-defined network to connect to one or more cloud providers. Thus, in an embodiment, the system and interface to create and orchestrate the software-defined network may essentially be provided as a service in the cloud, i.e., the network is effectively in the cloud and provided as a service to a customer.

In an embodiment, there is provided a hosting system to facilitate a customer of an operator of the system to connect to a cloud provider, the system comprising: a first cloud exchange co-located with and connected to first cloud provider equipment; a second cloud exchange co-located with and connected to second cloud provider equipment, wherein the first cloud provider equipment and the second cloud provider equipment are of a same cloud provider but at different geographically spaced locations or the first cloud provider equipment is of a different cloud provider than that of the second cloud provider equipment, and wherein the first cloud exchange is connected to the second cloud exchange; and a non-transitory computer readable medium comprising computer program instructions, the instructions configured to facilitate the configuration of a software-defined network including the first cloud exchange and/or second cloud exchange, wherein the network connects the customer to the first cloud provider equipment and/or the second cloud provider equipment.

In an embodiment, there is provided a hosting system to provide a software-defined network as a service, the system comprising: a cloud exchange co-located with and connected to cloud provider equipment; a non-transitory computer readable medium comprising computer program instructions, the instructions configured to: configure a virtual networking device at the cloud exchange and/or at a customer point of presence, receive a software-defined network specification from a customer of the operator of the system, and create a software-defined network based on the received specification, wherein the software-defined network includes the virtual networking device and connects equipment of the customer to the cloud provider equipment.

In an embodiment, there is provided a method to facilitate a customer of an operator of a system to connect to a cloud provider, the method comprising: facilitating configuration of a software-defined network including a first cloud exchange of the system and/or a second cloud exchange of the system, the network connecting the customer to first cloud provider equipment and/or second cloud provider equipment, wherein the first cloud exchange is co-located with and connected to the first cloud provider equipment, wherein the second cloud exchange is co-located with and a connected to the second cloud provider equipment, the first cloud provider equipment and the second cloud provider equipment being of a same cloud provider but at different geographically spaced locations or the first cloud provider equipment being of a different cloud provider than that of the second cloud provider equipment, and wherein the first cloud exchange is connected to the second cloud exchange.

In an embodiment, there is provided a method of providing a software-defined network as a service, the method comprising: configuring a virtual networking device at a customer point of presence and/or a cloud exchange co-located with and connected to cloud provider equipment; receiving a software-defined network specification from a customer of an operator of the cloud exchange and/or customer point of presence, and creating a software-defined network based on the received specification, wherein the software-defined network includes the virtual networking device and connects equipment of the customer to the cloud provider equipment.

It is to be understood that both the foregoing general description and the following detailed description are exemplary and not restrictive of the scope of the invention.

DETAILED DESCRIPTION

Figure 1:
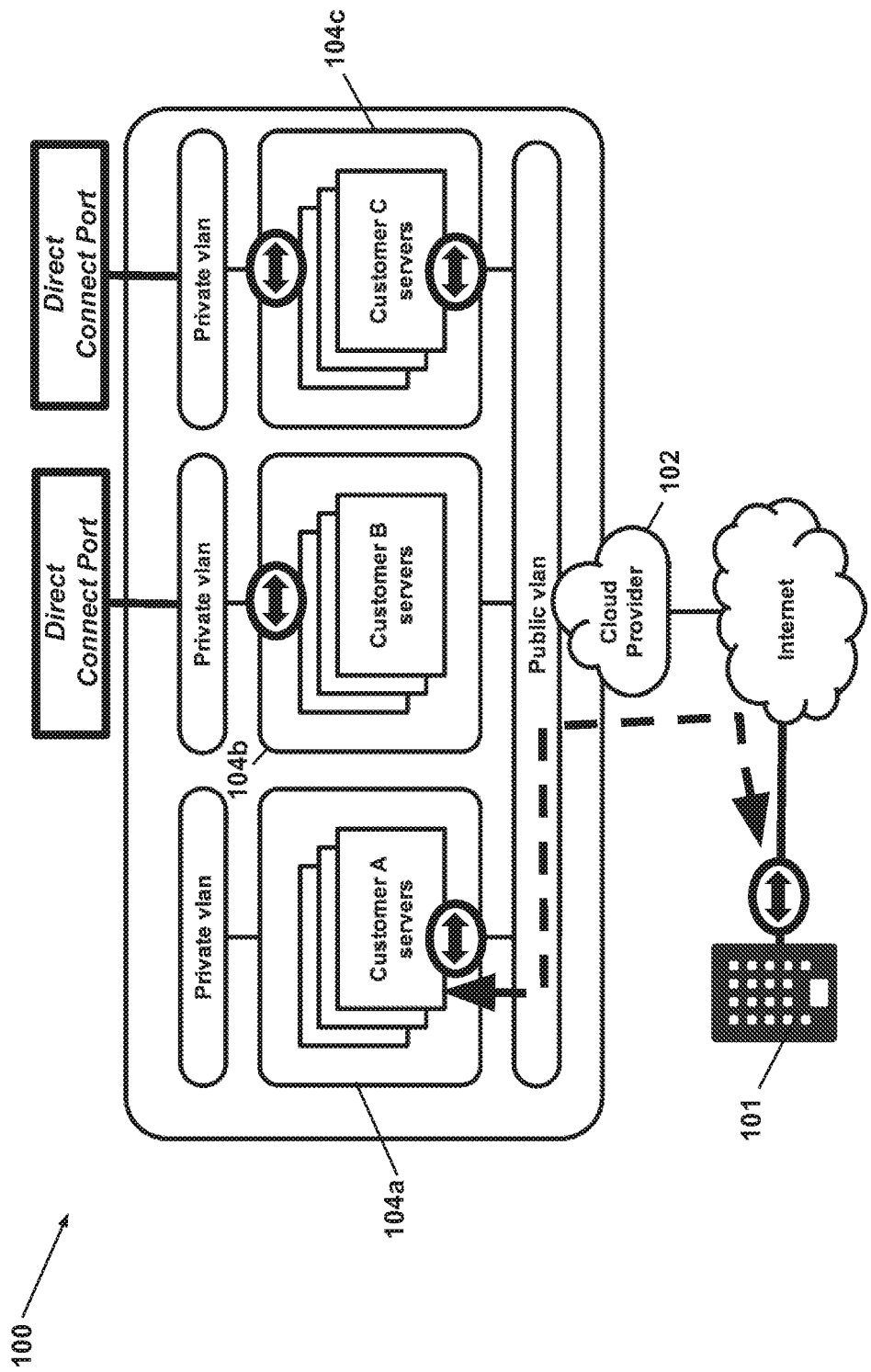
FIG. 1 is a schematic illustration of a cloud provider network architecture.

FIG. 1 schematically illustrates an example cloud provider network architecture 100. Using this architecture, a customer business location 101 is connected to a cloud provider 102 over the internet. In an embodiment, a cloud provider may include a virtual machine hosting provider, a software as a service provider, etc. A virtual private network (VPN) (the dashed line in FIG. 1) is set up for the customer to access one or more servers 104a, 104b, 104c of the cloud provider 102. As an example, a particular customer may be assigned certain servers 104a while another customer may be assigned certain other servers 104b. Those one or more servers may be dedicated hardware computing machines and/or virtual machines. Within the cloud provider's environment, the customer may establish a private virtualized local area network (private vlan) among the hardware computing machines and/or virtual machines dedicated to the customer. To access the resources dedicated to the customer, the customer may access the cloud provider via the internet and pass through a public virtualized local area network within the cloud provider by which all the customers can access their respective resources. Connecting to a cloud provider 102 over the internet, however, may suffer from one or more problems. For example, the internet, being a network of networks, typically does not have a dedicated circuit from the business location to the cloud provider. Therefore, a connection over the internet may have high latency and/or low throughput. The internet may also suffer from low reliability because various networks within the internet may overload or fail without any warning. Further, the internet, being a public network, may be prone to security concerns.

Figure 2:
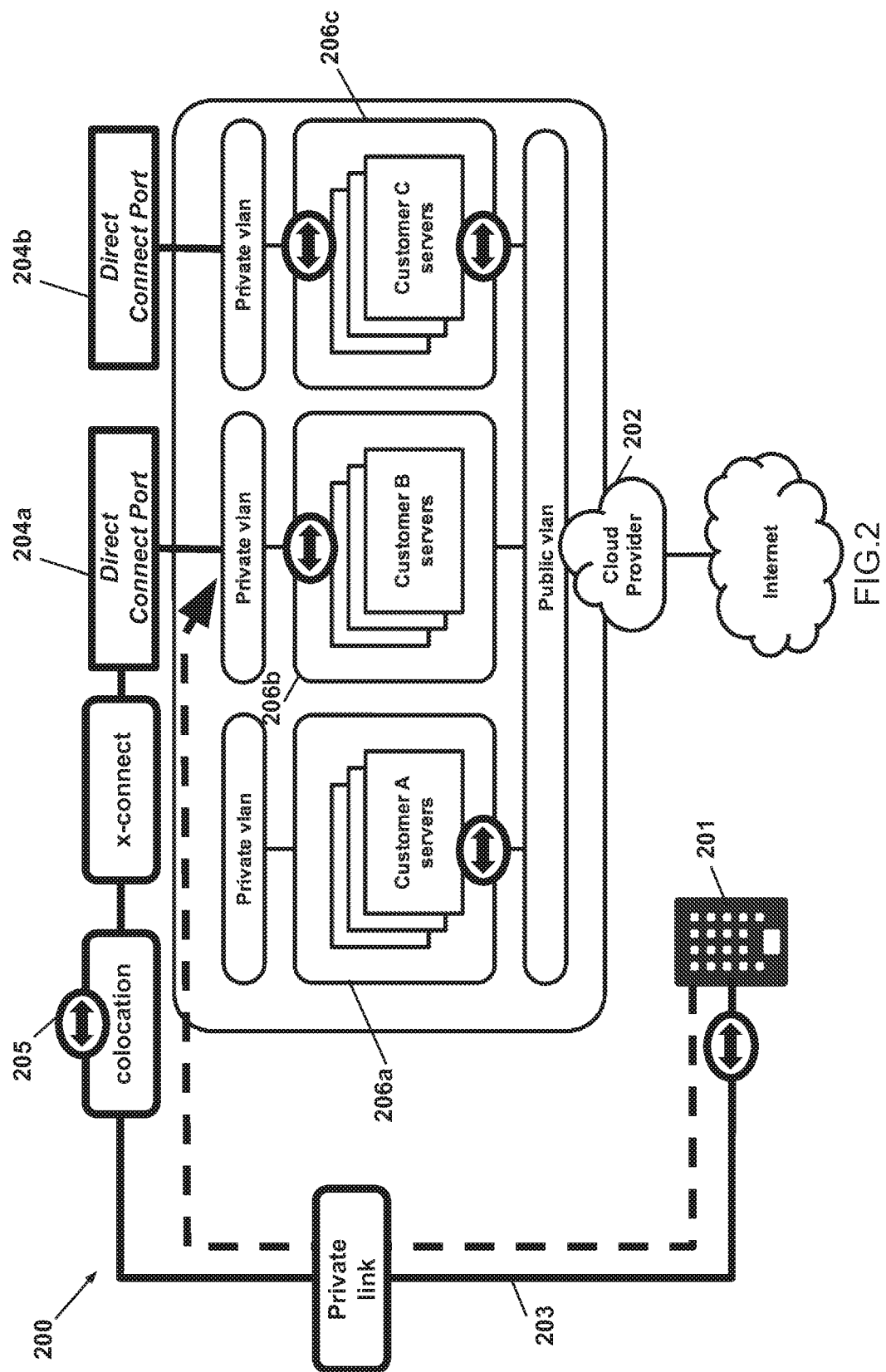
FIG. 2 is a schematic illustration of another cloud provider architecture.

To allay one or more those (or other) problems, a customer may wish to establish a direct private connection or link to the cloud provider in addition to or as an alternative to connecting through the internet. The direct connection is through a direct connect port of the cloud provider, and is made through a dedicated router of the customer co-located with the cloud provider and a dedicated telecommunication link, acquired by the customer, between the router and the customer. FIG. 2 schematically illustrates another example cloud provider network architecture 200. In this architecture, a business location 201 is connected to the customer's dedicated one or more servers 206b of the cloud provider 202 using a private link 203 instead of the internet. The cloud provider 202 provisions direct connect ports 204a, 204b for customers to access their dedicated servers 206a, 206b, 206c. The business location 201 uses the private link 203 to connect to the customer's dedicated router 205, which is in turn cross-connected via telecommunications link to the port 204a provisioned by the cloud provider 202. A virtual private network (VPN) (the dashed line in FIG. 2) may be set up for the customer to access one or more servers 206b of the cloud provider 202.

A private connection 203 to the cloud provider 202 may have its own one or more problems. For example, the customer 201 has to request a connection, negotiate and sign one or more contracts, expend time and cost therefor and perhaps be subject to various fees (such as termination fees and/or co-location fees). Further, weeks, if not months, may be spent in the process of requesting a private connection, getting approved, and negotiating the contracts.

Furthermore, for a private connection 203, a customer typically has to install and maintain expensive networking equipment (e.g. router 205) in proximity to the cloud provider's equipment. Needless to say, the installation and maintenance of such equipment calls for a significant amount of capital investment. Furthermore, if the business customer 201 wants to switch to another cloud provider, another private link has to be procured and further networking equipment has to be co-located in the vicinity of the other cloud provider. The problem gets worse if the switching takes place before the expiration of the term of one or more contracts in which case the business customer may have to pay a hefty early termination fee to the cloud provider, the link provider, etc.

And, if a business wants a connection to an additional cloud provider through a private connection, the above outlined process of request and approval of the connection, negotiation and signing of contracts, setting up network equipment has to be repeated all over again. The problem is compounded when the business has multiple locations wishing to connect to multiple cloud providers and/or multiple separate facilities of a single cloud provider. Thus, using private links may become prohibitively expensive, cumbersome, inflexible, etc. for a customer.

Figure 3:
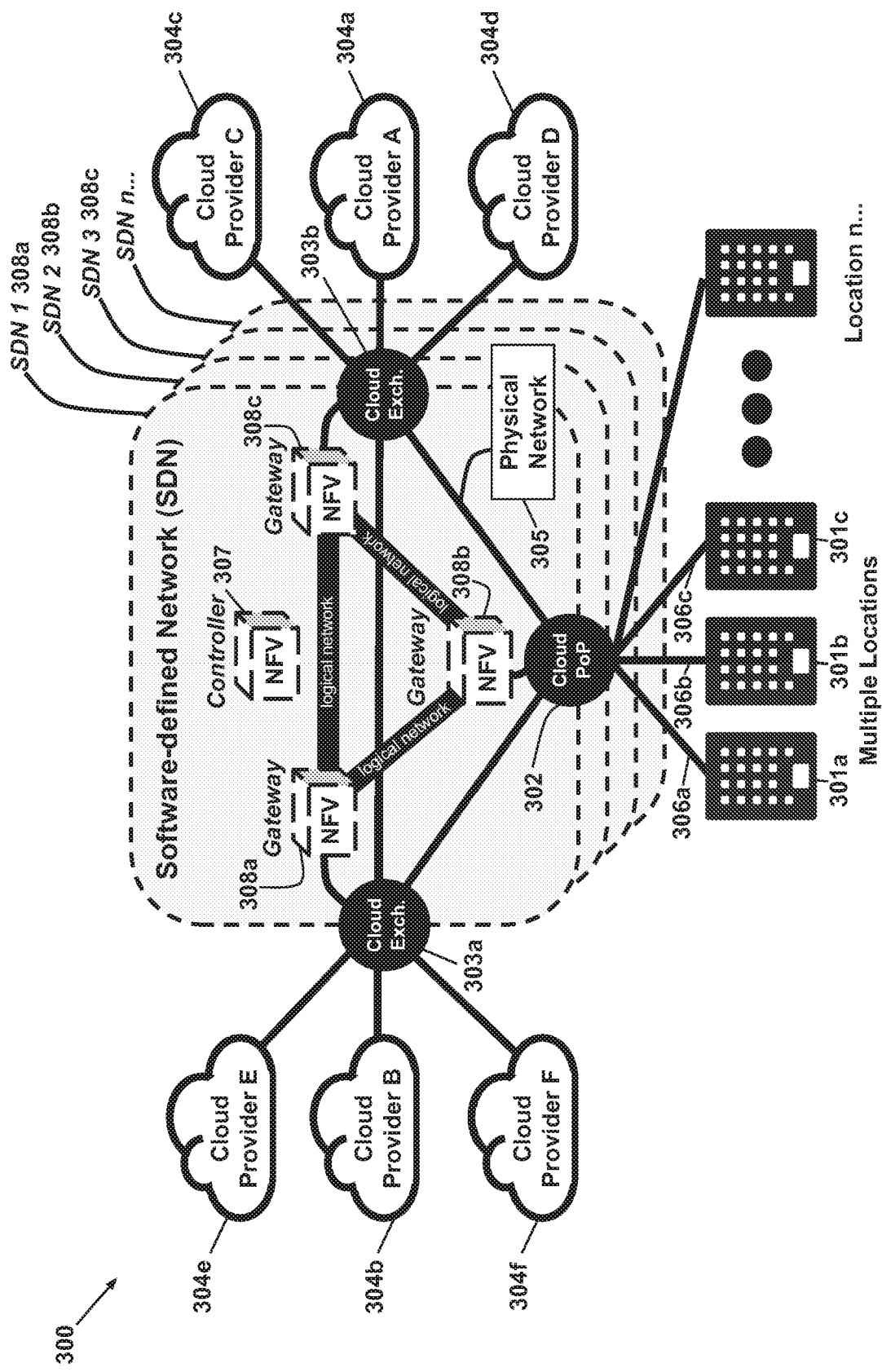
FIG. 3 is a schematic illustration of an example system to provide one or more virtual network devices and services to create a software-defined network in a cloud environment, according to various implementations.

FIG. 3 schematically illustrates an example system 300 which solves one or more of the above-mentioned (or other) problems by providing a customer a virtual network devices and services to create a software-defined network in a cloud environment. The system 300 provides customers with flexibility to configure (which herein includes reconfigure) their own networks, e.g., a logical network using hardware in system 300, in a short time. The system may enable quick connection by a customer to a cloud provider without having to take the time, cost, etc. to provision, for example, their own private connection and/or co-located equipment with a cloud provider. The system may also enable connection to a cloud provider without going through the internet and thus may reduce costs in using a cloud provider. The system may enable a more secure connection to a cloud provider. The system may enable a faster connection to a cloud provider than, e.g., the internet.

The system 300 incorporates network function virtualization (NFV) to provide virtual network devices, which can be instantiated and deployed to create any number of software-defined networks (SDNs) to connect to any number of cloud providers. In an implementation, the system 300 is provided by a third party separate from the customers. In an implementation, the system 300 is provided by a third party separate from the customers and the cloud providers. In an embodiment, the administrator of the system 300 may, for example, control one or more aspects of the software-defined networks, such as limit the bandwidth of a software-defined network. Thus, an administrator of system 300 may control the bandwidth of a software-defined network and, for example, charge the customer depending on bandwidth.

In some implementations, the system 300 may comprise one or more Cloud Points of Presence (PoPs) 302 connected to one or more Cloud Exchanges 303a, 303b by a physical network. That is, the one or more Cloud PoPs and one or more Cloud Exchanges may be connected to each other through a high performance optical fiber backbone 305. One Cloud PoP and two Cloud Exchanges are shown in FIG. 3 to describe the embodiments of the system. However, it should be understood that the system also contemplates multiple Cloud PoPs and multiple Cloud Exchanges connected to each other.

In some implementations, a Cloud Exchange 303 may interface with one or more cloud providers. For example, Cloud Exchange 303b interfaces with three cloud providers: Cloud provider C (304c), cloud provider A (304a) and cloud provider D (304d) at a same general location. As another example, Cloud Exchange 303a interfaces with three cloud providers: cloud provider E (304e), cloud provider B (304b) and cloud provider F (304f). While one Cloud Exchange is shown as connected to a plurality of cloud providers, in an embodiment, each cloud provider may have an associated Cloud Exchange. In some implementations, a cloud exchange may be co-located (within 200 yards and/or having a direct connection) with a cloud provider equipment. Co-located means within the same storage rack as the cloud provider equipment, in the same datacenter as the cloud provider equipment, in the same building as the cloud provider equipment, on the same campus as the cloud provider equipment, within 300 yards or less of the cloud provider equipment, within 200 yards or less of the cloud provider equipment, within 100 yards or less of the cloud provider equipment, or within the range of a direct line connection that is not intermediated by an amplifier, repeater or router.

Further, one or more cloud providers may be at a geographically spaced location (e.g., at least 1 mile apart, at least 10 miles apart, at least 100 miles apart, at least 1000 miles apart) from another cloud provider and accordingly, a first Cloud Exchange may be provided with a first cloud provider and a second Cloud Exchange may be provided at a second cloud provider that is geographically spaced from the first cloud provider. Connectivity to multiple cloud providers allows a customer the flexibility of including multiple cloud providers in the customer's network and/or switching between cloud providers. A customer may easily add, drop or exchange one or more cloud providers.

In some implementations, multiple locations of a business 301a, 301b, 301c . . . may be connected to a Cloud PoP 302, e.g., a customer interface. As will be appreciated, each business location may be connected to a different Cloud PoP. Each individual link 306a, 306b, 306c . . . may be a private connection and/or a connection over the internet. Private connection may be used when a business location is in geographic proximity to Cloud PoP 302. Connection over the internet may be used when a business location is not within a reasonable geographic distance from a Cloud PoP 302. In some implementations, a business location may have both a private connection and connection over the internet, wherein the private connection works as a primary link and the connection over the internet acts as a backup link. Furthermore, each private connection and each connection over the internet may comprise of two redundant links. The redundancy ensures the smooth operation of the network even if one or more of the links fail.

In some implementations, the system 300 incorporates network function virtualization (NFV) to provide customers with virtual network devices. The virtual networks devices may be one or more controllers, e.g. 307 and/or one or more gateways, e.g. 308a, 308b, 308c. A customer may instantiate these virtual networks devices and may deploy them to configure a customized software-defined network (SDN) on demand. In some implementations a customer may configure multiple SDNs 309a, 309b, 309c . . . using the physical infrastructure of system 300.

Figure 4:
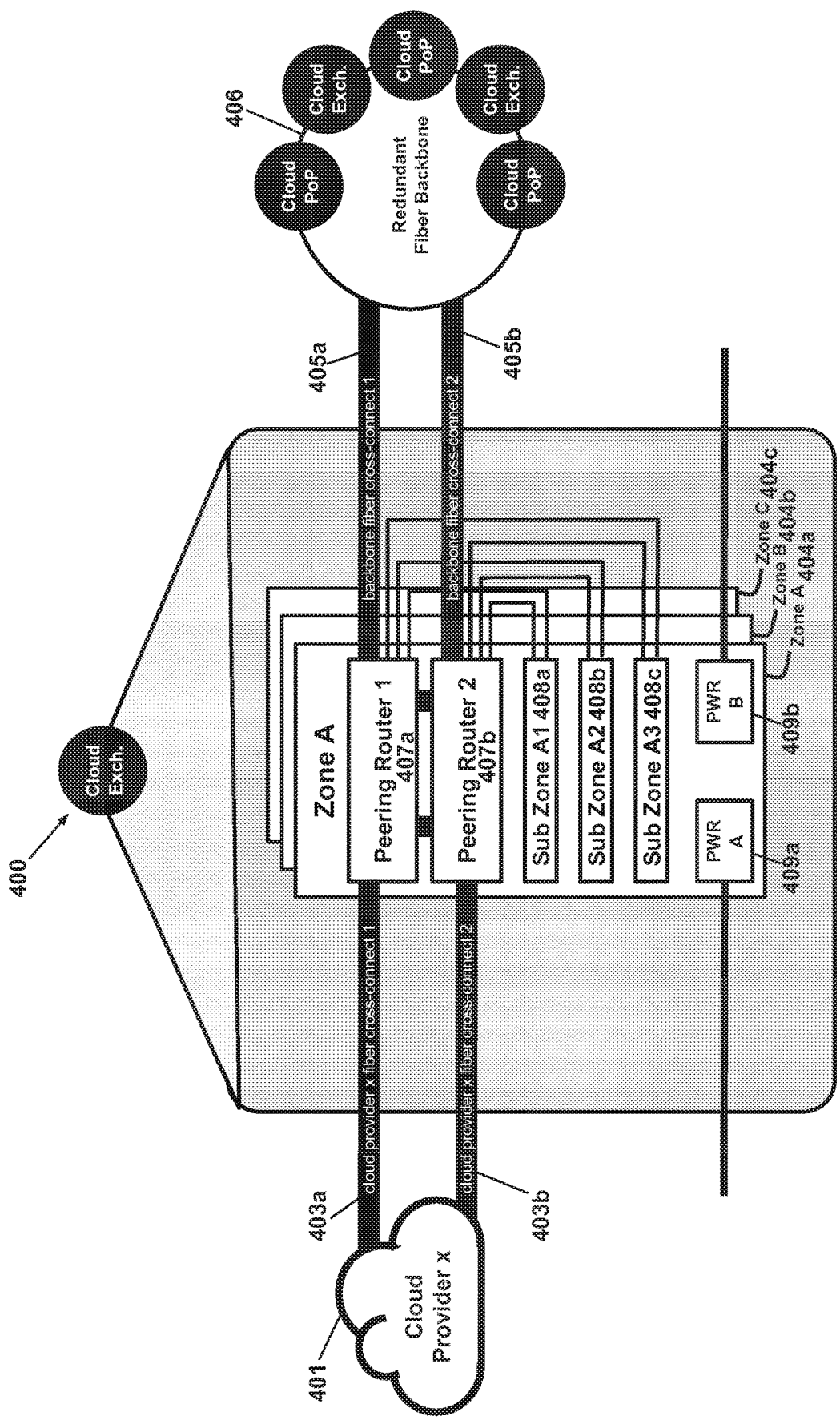
FIG. 4 is a schematic illustration of an example system which interfaces with a cloud provider, according to various implementations.

FIG. 4 schematically illustrates an example of Cloud Exchange 400, which as discussed herein is co-located with the cloud provider and provides the connection between a Cloud PoP (and thus a customer) to the cloud provider. Each Cloud Exchange 400 is a combination of hardware and software. In some implementations, the Cloud Exchange 400 may comprise multiple zones, for example: zone A (404a), zone B (404b), and zone C (404c). Each zone may be powered by a pair of redundant power supplies, 409a and 409b. Each zone may include a pair of peering routers 407a and 407b. The peering routers may connect to a cloud provider 401 at one end using a pair of redundant fiber optic links 403a and 403b, and the network backbone 406 at the other end using a pair of redundant fiber optic links 405a and 405b. The pair of peering routers 407a and 407b may be connected to each other as well. Using a pair of peering routers and a pair of redundant links creates two redundant connections between the cloud provider 401, a zone (e.g. Zone A, 404a) of the Cloud Exchange 400, and the network backbone 406 to help ensure that the system remains operational if, for example, one of the connections and/or routers fail. In some implementations, each zone may further comprise sub-zones, for example: sub-zone A1 (408a), sub-zone A2 (408b) and sub-zone A3 (408c). Each sub-zone may be connected to both of peering routers 407a and 407b. Each sub-zone may comprise computer hardware for a server and software. Each sub-zone may be connected to a peering router by a fiber connection. Each zone comprises one or more physical peering routers and at least one sub-zone comprising physical server hardware.

Figure 5:
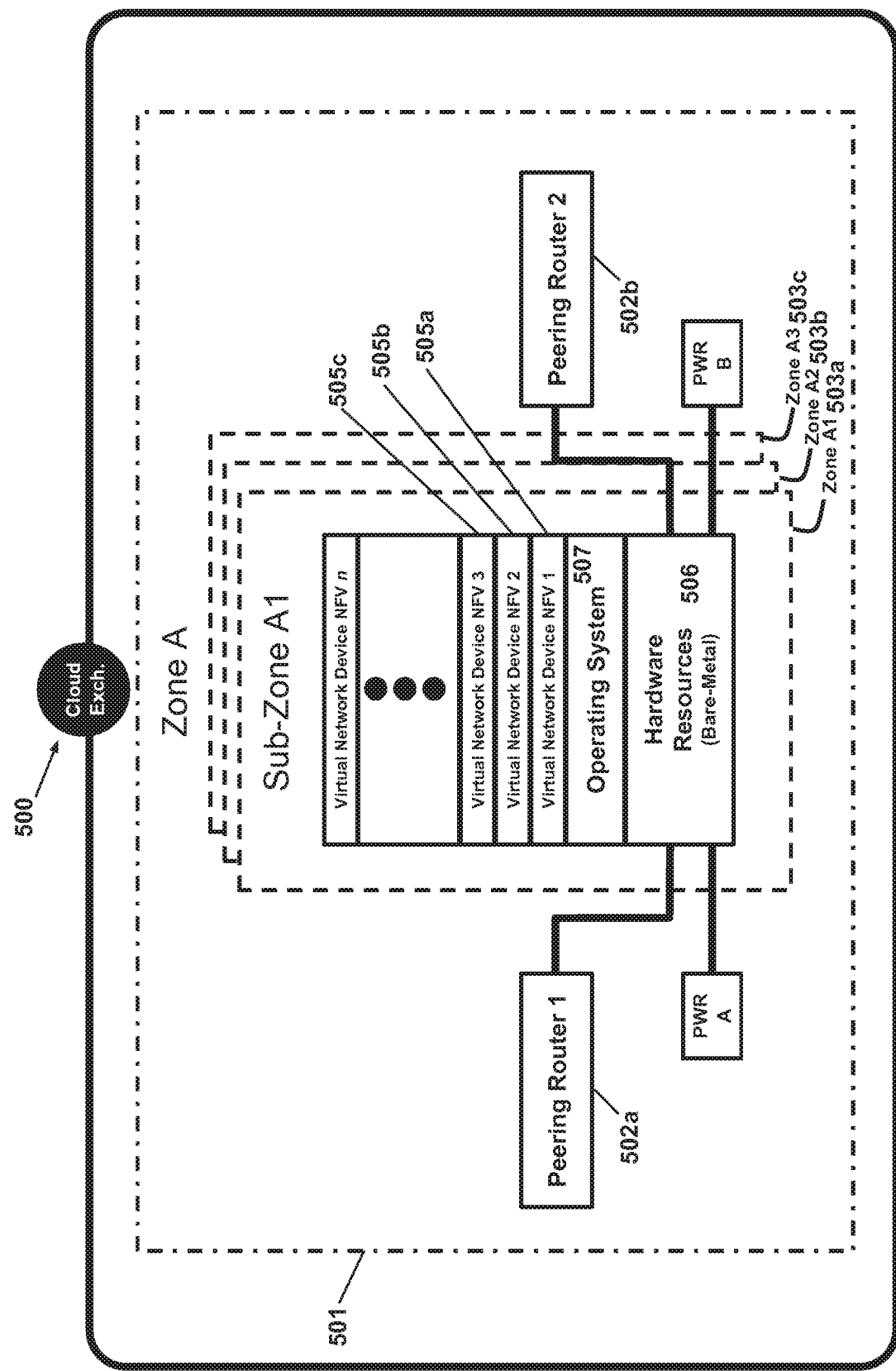
FIG. 5 is a schematic illustration of an example of a zone within the system illustrated in FIG. 4, according to various implementations.

FIG. 5 schematically illustrates an example of sub-zones 503a, 503b, 503c within a zone 501 of a cloud exchange 500. In some implementations, each sub-zone (e.g. 503a) may comprise a "bare-metal" hardware resource 506. The hardware resource 506 may connect to the pair of peering routers 502a and 502b. In some implementations, multiple virtual network devices 505a, 505b, 505c . . . deployed in the software-defined network may be instantiated on the operating system 507 of the hardware resource 506 of a sub-zone 503a.

In some implementations, a virtual network device (e.g. 505a) may be localized within a same sub-zone (e.g. 503a). For example, an instance of a virtual network controller or a gateway may use the hardware included in a particular sub-zone. In some implementations, a redundant virtual network device may be instantiated on the hardware of a different sub-zone. Instantiating the redundant virtual network devices on two different sub-zones helps ensure the availability of the virtual network device if, for example, one of the sub-zones fails.

In some implementations, the virtual network devices 505a, 505b, 505c . . . may be instantiated on the hardware resources 506 without the use of a hypervisor. In some implementations, the virtual network devices 505a, 505b, 505c . . . may run on a proprietary operating system 507. In some implementations, the virtual network devices may be constructed using containers.

Figure 6:
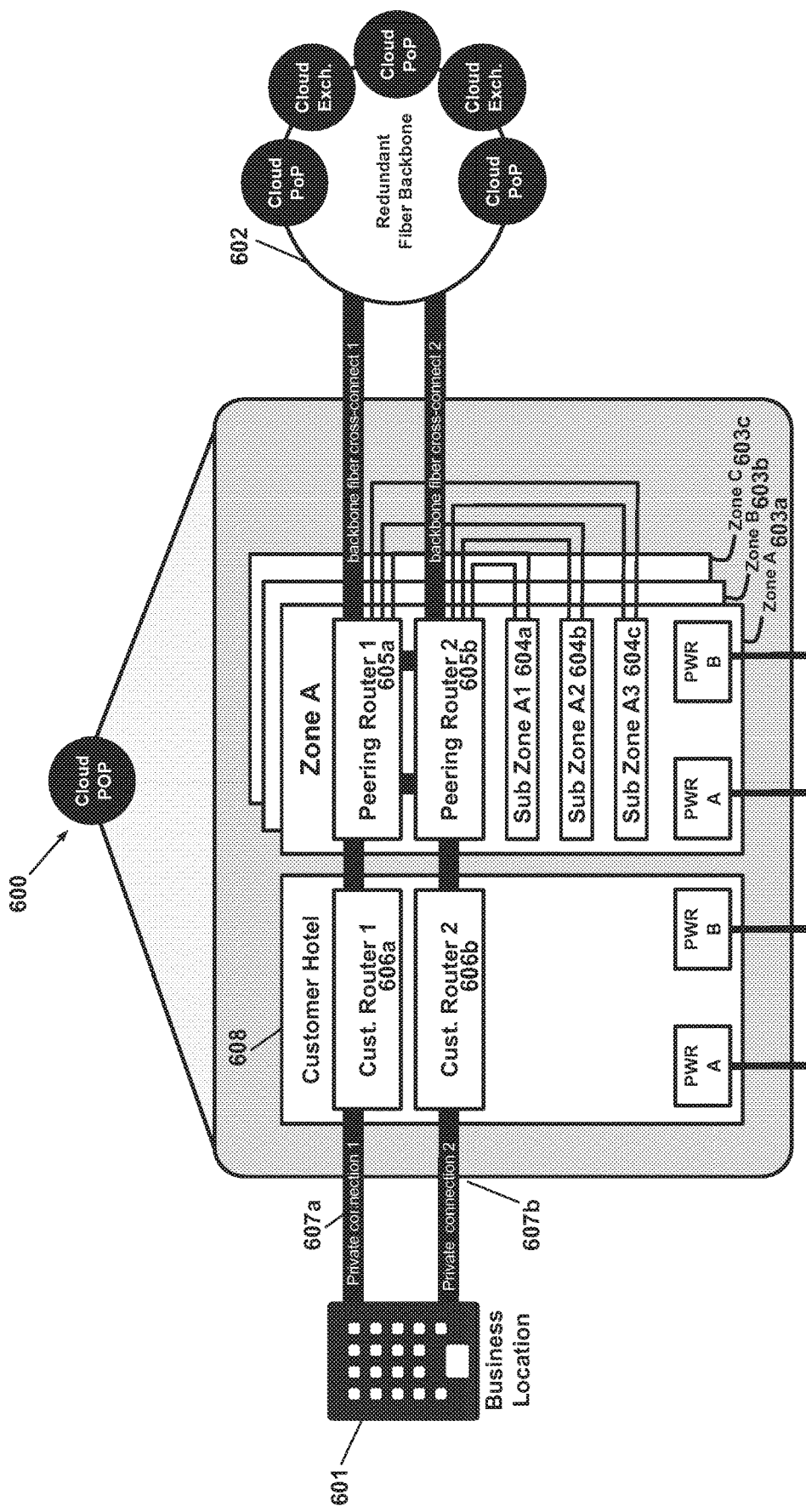
FIG. 6 is a schematic illustration of an example system which interfaces with a customer and its business locations using a private connection, according to various implementations.

FIG. 6 schematically illustrates an example of a Cloud Point of Presence (PoP) 600, which as discussed herein enables the customer to access the network defined in the system 300 and thus connects the customer to one or more Cloud Exchanges (and their one or more associated cloud providers). Each Cloud PoP 600 is a combination of hardware and software. In some implementations, the Cloud PoP may comprise of multiple zones 603a, . . . . Furthermore, a zone may further comprise multiple sub-zones, for example, sub-zones A1 (604a), A2 (604b) and A3 (604c). Each sub-zone may be connected to a pair of peering routers 605a and 605b. The peering routers may be connected to each other. In some implementations, the peering routers 605a and 605b may be connected to customer routers 606a and 606b at one end, and to the fiber optic backbone 602 at the other end.

In some implementations, a sub-zone (e.g. 604a) in the Cloud PoP may be similar to the sub-zone in the Cloud Exchange. Like its counterpart in a Cloud Exchange, a sub-zone in the Cloud PoP may comprise "bare-metal" hardware resources connected to a pair of peering routers. Likewise, multiple virtual network devices may be instantiated and deployed on the hardware resources of a sub-zone.

In some implementations, a virtual network device may be localized within a same sub-zone. For example, an instance of a virtual controller or gateway may use the hardware included in a particular sub-zone. In some implementations, a redundant virtual network device may be instantiated using the hardware of a different sub-zone. Instantiating the redundant virtual network devices in different sub-zones helps ensure the availability of the virtual network device if, for example, one of the sub-zones fails.

In some implementations, a customer may connect to a Cloud PoP 600 through a private link. The desire for a private link may be for any number of reasons, e.g., a private link may be faster, more reliable, and/or more secure than the internet. The private link may comprise a pair of redundant connections 607a and 607b. The private link may be provided by a telecommunications provider. In some implementations, a connection over the internet may be maintained in addition to the private link. The private link may be used as the primary link and the connection over the internet may be used as a secondary link in case, for example, the private link fails.

In some implementations, when a customer uses a private link to connect to a Cloud PoP 600, the customer may maintain networking equipment in close proximity to the Cloud PoP. The networking equipment may comprise a pair of routers 606a and 606b. In some implementations, the customer equipment (e.g. routers 606a and 606b) may be hosted at a "customer hotel" 608, i.e., space available at the Cloud PoP location for use by equipment dedicated to the customer (such as customer supplied equipment). The customer routers 606a and 606b at one side may interface with the private connections 607a and 607b coming in from the customer's business location. On the other side, the customer routers 606a and 606b may interface with the Cloud PoP equipment (e.g. peering routers 605a and 605b) to provide the connectivity from the business location to the Cloud PoP. In some implementations, a single Cloud PoP hotels networking equipment for multiple customers. In some implementations, a customer may hotel networking equipment at multiple Cloud PoP locations, for example, when geographically distributed business locations want to connect to respective Cloud PoPs close to each of the locations. Advantageously, the Cloud PoP 600 may be relatively remote from cloud provider equipment and thus a customer may effectively obtain a private connection to cloud provider equipment that may be significantly lower cost, technically simpler, etc. than the customer obtaining a private connection directly to cloud provider equipment.

Figure 7:
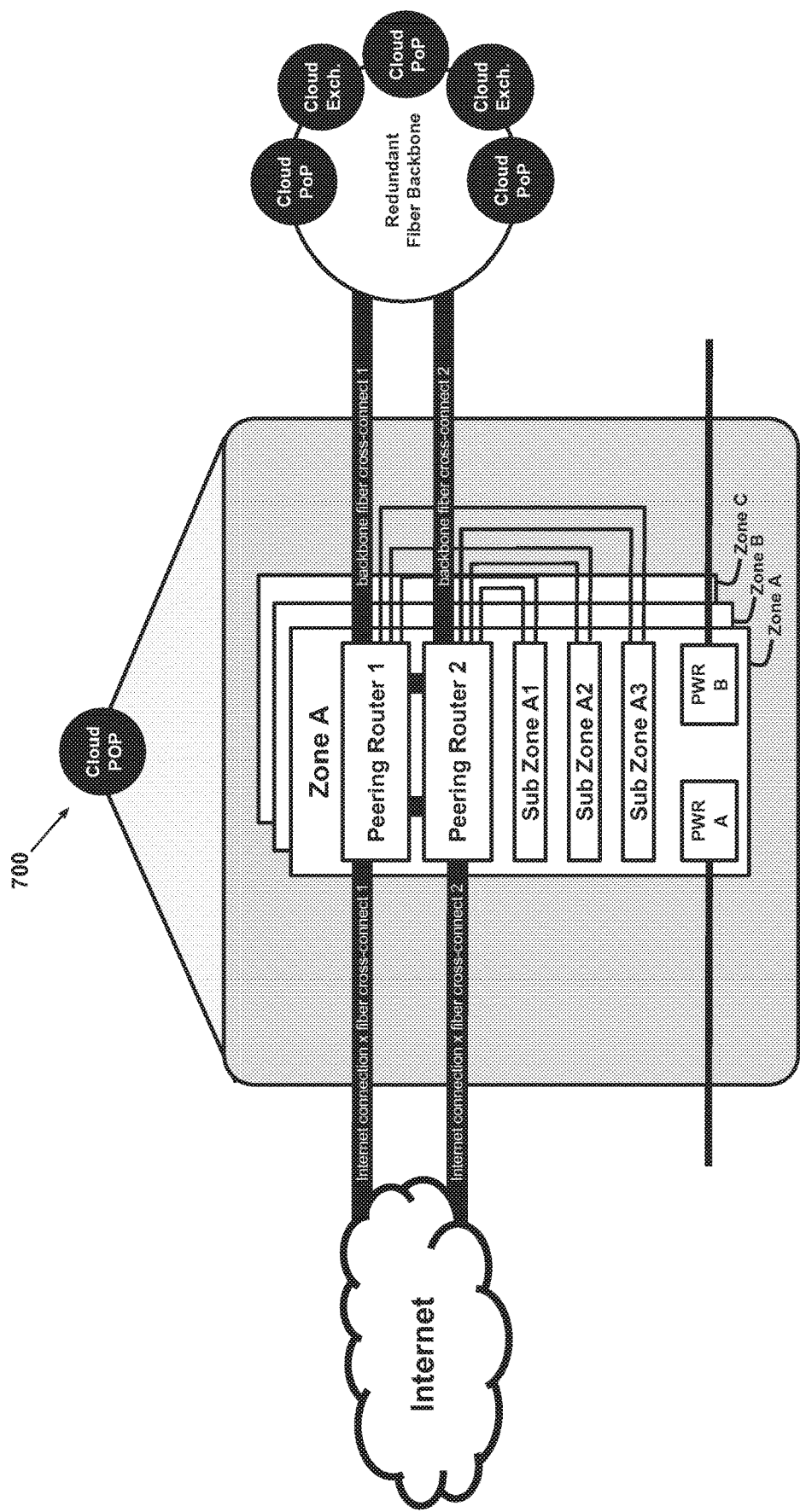
FIG. 7 is a schematic illustration of an example system which interfaces with a customer and its business locations using an internet connection, according to various implementations.

FIG. 7 schematically illustrates an embodiment wherein a customer may connect to the Cloud PoP 700 over the internet. When the customer connects to the Cloud PoP 700 over the internet, the customer need not maintain networking equipment at the site of the Cloud PoP. A connection over the internet may be beneficial for a customer when a Cloud PoP is not in close proximity, a private connection is not feasible or economical, and/or as a backup to a private connection. For example, a customer may want to connect to the Cloud PoP from outside a business location using a laptop (e.g., from a hotel, an airport, etc.). In such a scenario, a private connection may not be practical. Various authentication and security measures may be applied for the connection over the internet.

Figure 8:
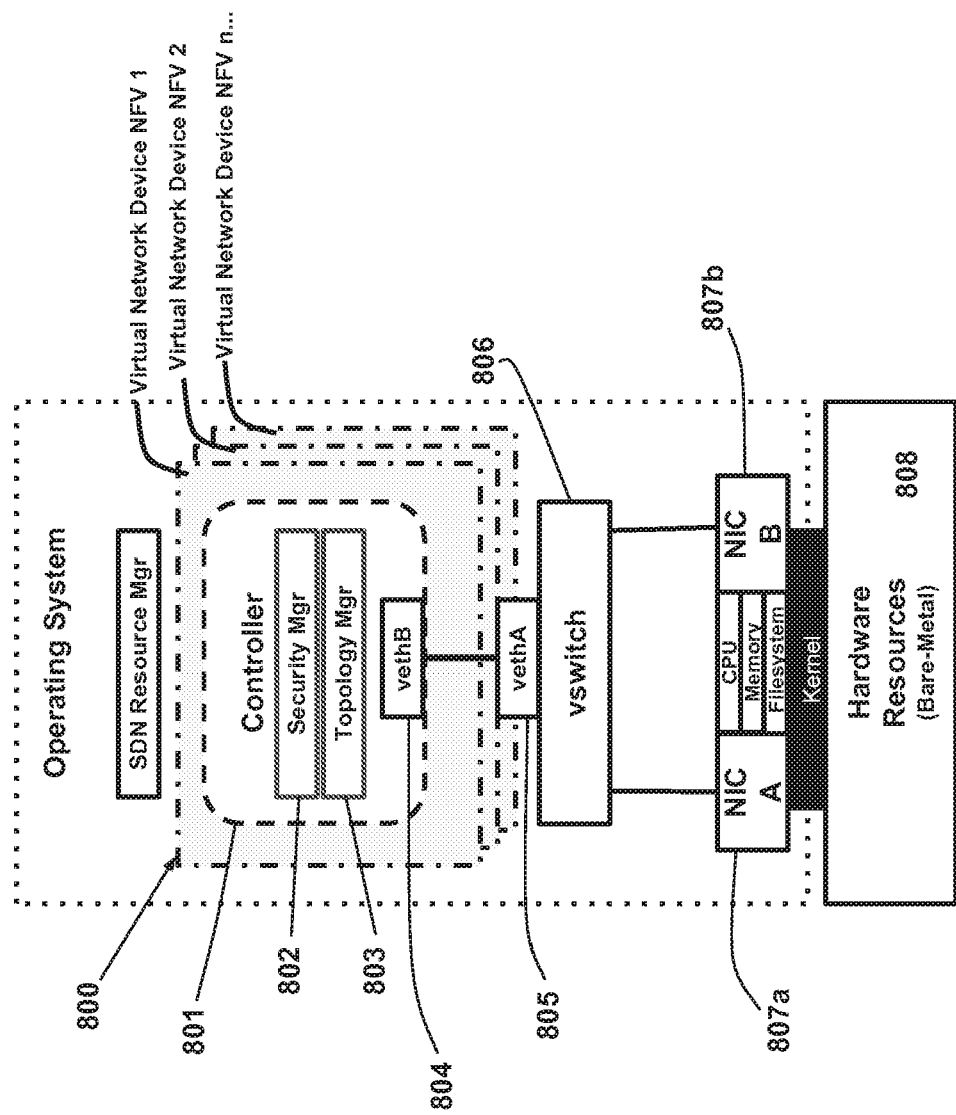
FIG. 8 is a schematic illustration of an example of a virtual controller in the software-defined network, according to various implementations.

FIG. 8 schematically illustrates an example of a virtual network controller 800, which is a virtual network device in system 300 to enable control of traffic in a software-defined network defined over the physical infrastructure of system 300. In some implementations, the virtual network controller 800 may run as a process on an operating system installed on the "bare-metal" hardware resources 808 of a sub-zone. The sub-zone may be within a Cloud Exchange or a Cloud PoP. As will be appreciated, the virtual network controller 800 may be instantiated into multiple virtual network devices NFV1, NFV2, etc., which may all operate on the hardware resources 808 of a sub-zone and optionally each have a different configuration.

In some implementations, the virtual network controller may comprise a container 801. That is, the operating system has operating system-level virtualization that comprises a server virtualization method where the kernel of the operating system (e.g., a Unix-based operating system such as Linux) allows for multiple isolated user space instances, instead of just one. Such instances called containers (or virtualization engines (VE), virtual private servers (VPS) or jails) generally look and feel like a real server from the point of view of its owners and users. In addition to isolation mechanisms, the kernel typically provides resource management features to limit the impact of one container's activities on the other containers.

The virtual network controller 800 comprises a topology manager 803, a security manager 802 and a virtual network interface card 804 (e.g., a virtual Ethernet port). Where the controller 800 has a container 801, the container 801 comprises the topology manager 803, the security manager 802 and the virtual network interface card 804.

The topology manager 803 may maintain a list of all the other devices in the software-defined network which includes the controller 800. The security manager 802 may be responsible for the secure transfer of data among the nodes of the software-defined network by implementing techniques such as encryption, etc.

In some implementations, the virtual network interface card 804 in the virtual network controller 800 may connect to a virtual network interface card 805 implemented on a virtual switch 806. The virtual switch 806 may be implemented on a pair of Network Interface Controllers (NICs) 807a and 807b within the hardware resources 808 of a sub-zone. The NICs 807a and 807b may be connected to the peering routers of the zone in which the sub-zone resides.

In some implementations, the virtual network controller 800 may connect to and control other virtual gateways. In some implementations, the virtual network controller 800 may be connected to other virtual network controllers. In some implementations, the virtual network controller 800 may not connect to external entities, such as the cloud providers. In some implementations, multiple virtual network controllers can be implemented within a same sub-zone. In some implementations, redundant virtual network controllers may be implemented in different sub-zones.

Figure 9:
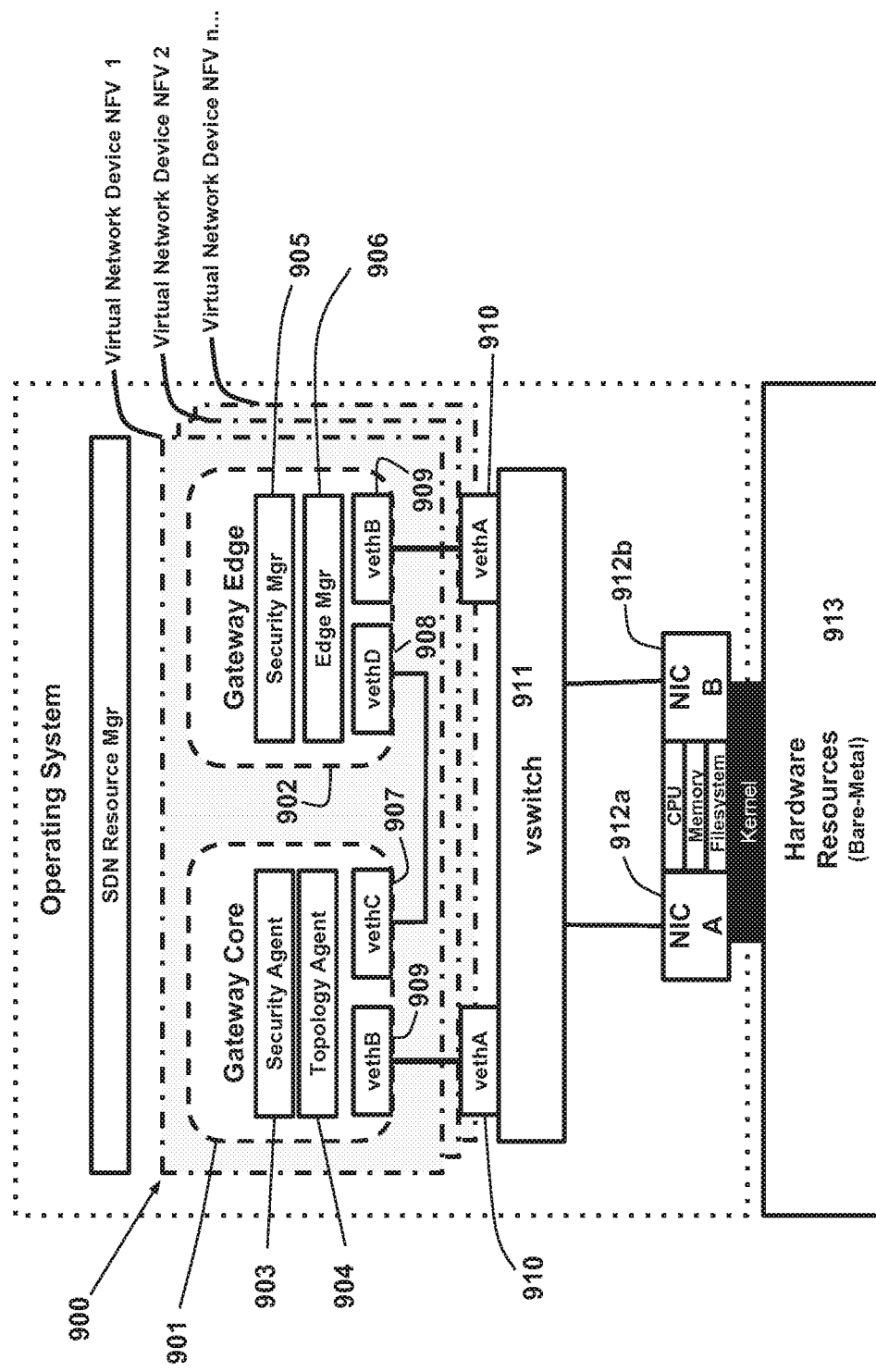
FIG. 9 is a schematic illustration of an example of a virtual gateway in the software-defined network, according to various implementations.

FIG. 9 schematically illustrates an example of a virtual gateway 900, which is a virtual network device used to enable communication with an external device and interact with one or more virtual network controllers 800 and/or one or more other instances of a virtual gateway 900. In some implementations, the virtual gateway 900 may run as a process on an operating system installed on the "bare-metal" hardware resources 913 of a sub-zone. The sub-zone may be within a Cloud Exchange or a Cloud PoP. As will be appreciated, the virtual gateway 900 may be instantiated into multiple virtual network devices NFV1, NFV2, etc., which may all operate on the hardware resources 913 of a sub-zone and optionally each have a different configuration.

In some implementations, the virtual gateway 900 may comprise a core container 901 and an edge container 902. The gateway core container 901 may interact with other virtual devices in the software-defined network, and the edge container 902 may interact with an external entity connected to the network. The external entity may be a cloud provider, a customer deploying the virtual network, etc. Where the external entity is customer equipment, the virtual gateway 900 may be characterized as an access gateway such as a mobile gateway or a site gateway. Where the external entity is cloud provider equipment, the virtual gateway 900 may be characterized as a cloud gateway.

In some implementations, the virtual gateway 900 (and optionally the gateway core container 901) may comprise a security agent 903 and a topology agent 904, which together may form a gateway core. The gateway core generally faces the internal network, i.e., it generally interacts with one or more virtual controllers defined in the network and/or with gateway cores of other virtual gateways in the network, and connects the internal network to a gateway edge, which in turn connects to the external device. For example, the topology agent 904 may interact with the topology manager (FIG. 8: 803) of a virtual network controller to receive a list of devices in the software-defined network (e.g., respectively defined by an IP address). The topology agent 904 then may cache the received list, and based on the list, may initiate connection with a neighbor virtual device, e.g., another virtual gateway or with a virtual controller. The security agent 903 may receive security credentials from the SDN automation engine (see, e.g, SDN automation engine 1001 in FIG. 10). When the virtual gateway 900 needs to connect to its controller, the security agent 903 may hand over those credentials to the controller so that the controller may trust the gateway 900.

In some implementations, the virtual gateway 900 (and optionally the gateway edge container 902) may comprise a security manager 905 and an edge manager 906, which together may form the gateway edge of the virtual gateway. The gateway edge generally faces the outside of the network, i.e., it generally may interact with the equipment of an external device, such as cloud provider equipment and/or customer equipment, and may connect the external device to the gateway core, which gateway core in turn may connect the external device to one or more virtual controllers defined in the network and/or with gateway cores of other virtual gateways in the network. The security manager 905 may receive security credentials from the SDN automation engine. The edge manager 906 may facilitate and maintain the network connectivity, which may be through a private link (e.g., to a customer or to a cloud provider) or the internet (e.g., IPSEC), at the edge of the system. For example, the edge manager 906 may set up and manage the network connectivity including managing credentials, routing protocols, etc.

In some implementations, the core container 901 and the edge container 902 of the virtual gateway may connect to each other through virtual network interface cards 907 and 908 (e.g., virtual Ethernet ports). Furthermore, both containers may have respective virtual network interface cards 909 which connect to a virtual switch 911 through virtual network interface cards 910. The virtual switch 911 may be implemented on a pair of Network Interface Controllers (NICs) 912a and 912b within the hardware resources 913 of a sub-zone. The NICs may be connected to the peering routers of the zone in which the sub-zone resides.

In some implementations, the virtual gateway may connect to one or more virtual network controllers. In some implementations, the virtual gateway may, additionally or alternatively, connect to one or more other virtual gateways. In some implementations, multiple virtual gateways may be implemented within a same sub-zone. In some implementations, redundant virtual gateways may be implemented in different sub-zones.

Figure 10:
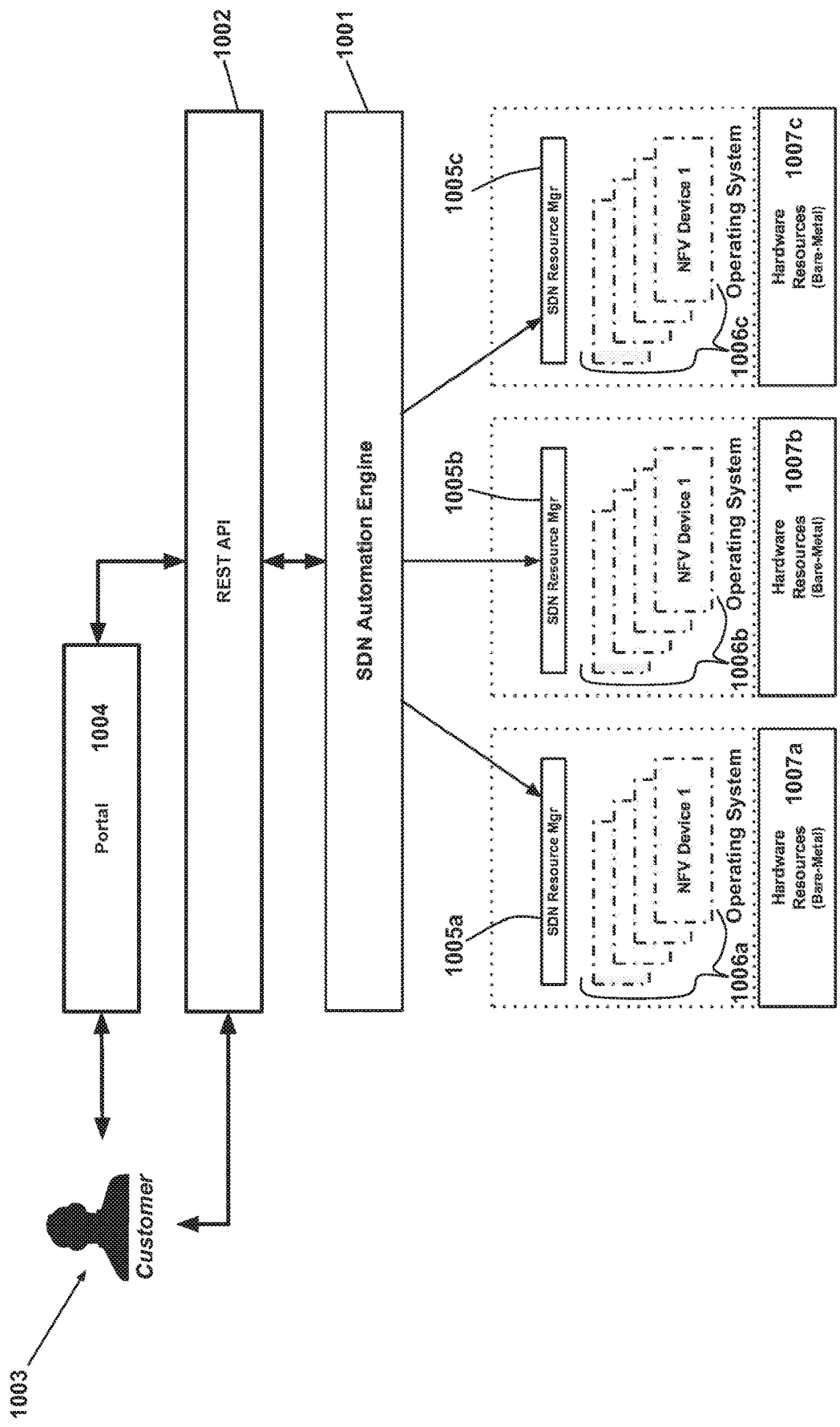
FIG. 10 is a schematic illustration of an example of a software-defined network (SDN) automation engine, according to various implementations.

FIG. 10 schematically illustrates an example of the schematics of a software-defined network (SDN) automation engine. The SDN automation engine facilitates a customer to create a software-defined network of virtual network devices (e.g., one or more virtual controllers 800 and/or one or more virtual gateways 900) on the physical infrastructure of system 300. In some implementations, the SDN automation engine 1001 makes a Representational State Transfer (REST) Application Programming Interface (API) 1002 available to a customer's application to configure a software-defined network. In some implementations, the SDN automation engine 1001 may provide a portal 1004 for a customer 1003 to configure the software-defined network. In an embodiment, the portal 1004 communicates with the SDN automation engine via the REST API 1002. When a customer configures the software-defined network, the SDN automation engine may interact with SDN resource managers 1005a, 1005b, 1005c, . . . SDN resource managers 1005a, 1005b, 1005c, . . . run as a process on an operating system installed on the "bare-metal" hardware resources 1007a, 1007b, 1007c, . . . of a sub-zone. The sub-zone may be within a Cloud Exchange or a Cloud PoP. SDN resource managers 1005a, 1005b, 1005c, . . . (see also, e.g., FIGS. 8 and 9) instantiate and/or deploy virtual network devices 1006a, 1006b, 1006c, . . . on the hardware resources 1007a, 1007b, 1007c, . . . in the one or more Cloud PoPs and/or Cloud Exchanges. The virtual network devices 1006a, 1006b, 1006c, . . . may be cloud gateways 900, access (e.g., mobile/site) gateways 900 or cloud controllers 800.

Figure 11:
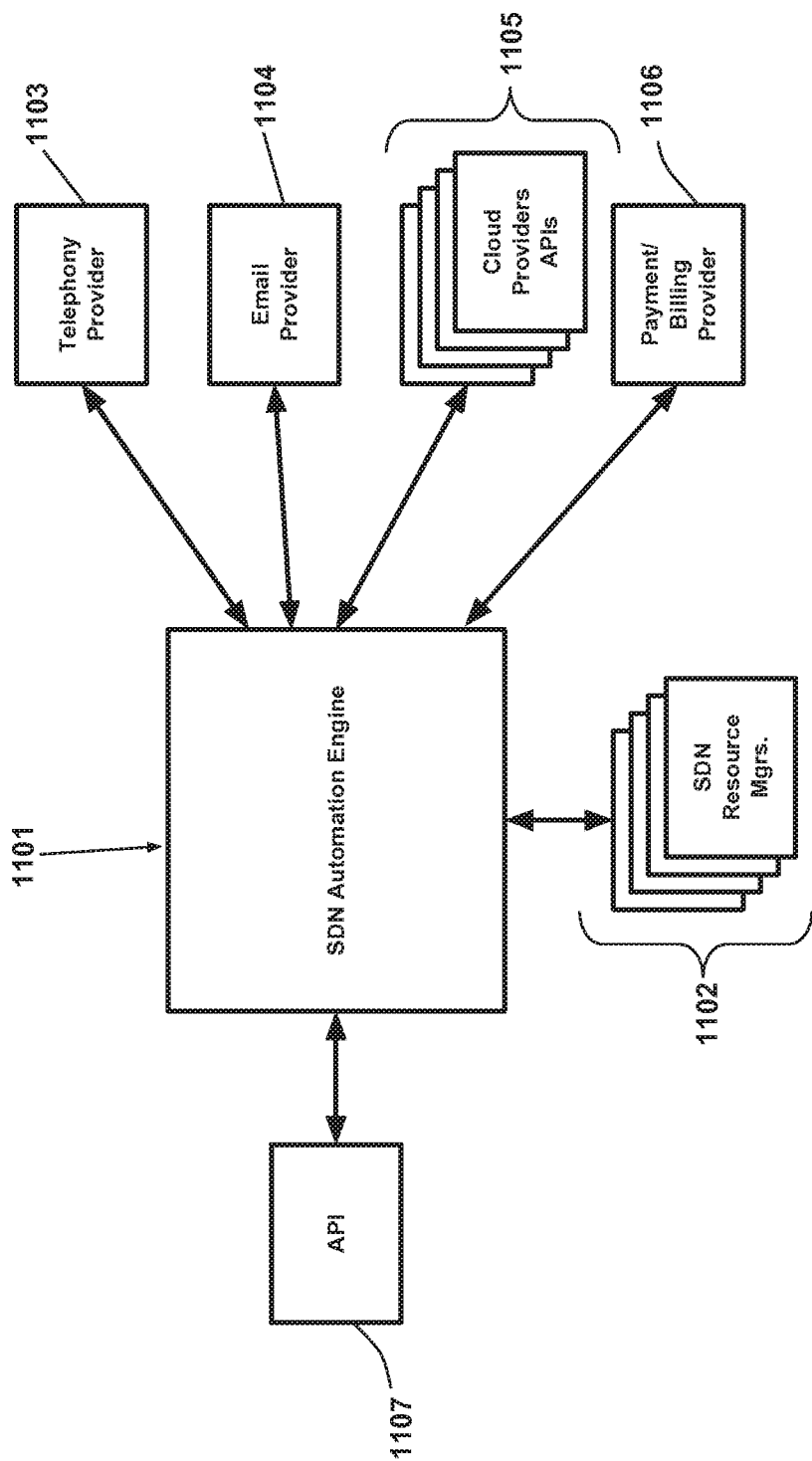
FIG. 11 is a schematic illustration of an example of modules interfacing with the SDN automation engine.

FIG. 11 schematically illustrates various entities and applications that may interface with the SDN automation engine 1101. As described above, the SDN automation engine may interface with the REST API 1107 (see REST API 1002 of FIG. 10) provided to the customer 1003 and/or the portal 1004. In some implementations, the SDN automation engine may interface with the SDN resource managers 1102 (see SDN resource managers 1005a, 1005b, 1005c, . . . of FIG. 10) to instantiate and/or deploy the virtual network devices in the software-defined network. In some implementations, the SDN automation engine 1101 may interact with various service providers, which may be third party service providers and/or separate programs that provide the respective service. In some implementations, the SDN automation engine 1101 may interact with a telephony provider 1103 for a token authentication process (a process that will be described below) and/or provide confirmation or notification messages (e.g., text messages, voice messages, etc.). In some implementations, the SDN automation engine 1101 may interact with an e-mail provider 1104 to send confirmation or notification e-mails to the customer configuring the network. In some implementations, the SDN automation engine 1101 may interact with the cloud providers' APIs 1105 to setup and manage the network traffic from the customer configured software-defined network to the cloud providers. In some implementations, the SDN automation engine 1101 may interact with a payment/billing provider 1106 to manage payment and billing matters. For example, in a pay as you go payment scheme, usage data of the system 300 is used to calculate a periodic bill to the customer. Also, the SDN automation engine may deny access to the network if, for example, the customer has been delinquent in payments despite, e.g., multiple notifications via telephone provider 1103 and/or email provider 1104.

Figure 12:
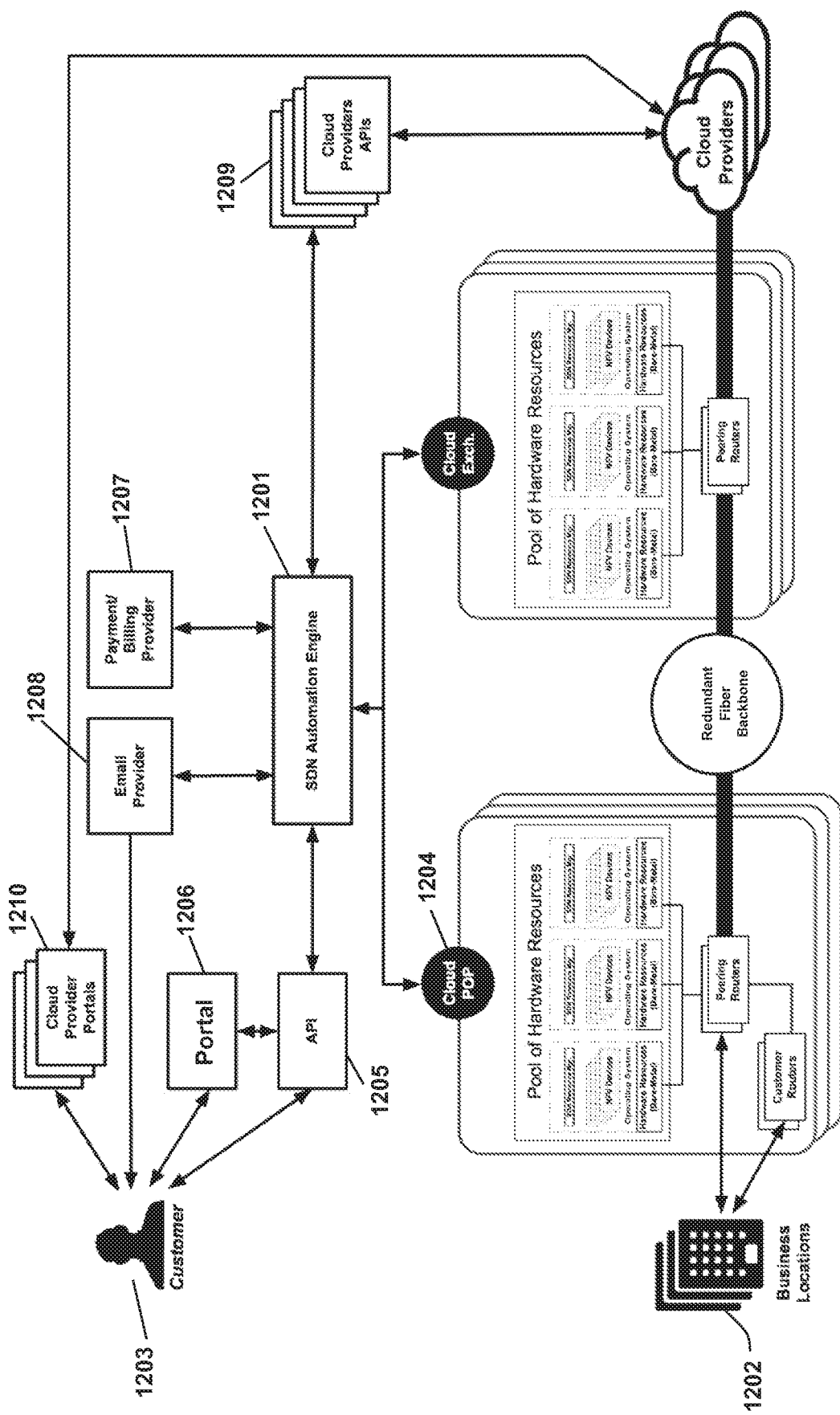
FIG. 12 is a schematic illustration of an example system to provide an on-demand deployment of a software-defined network (SDN), according to various implementations.

FIG. 12 schematically illustrates an example of the on-demand deployment of a software-defined network (SDN) using the SDN automation engine 1201. In this implementation of the system, the business location 1202 associated with the customer 1203 is already connected to a Cloud PoP 1204 (e.g., by a private connection and/or by an internet connection) and the customer 1203 already has an account with the system 300 comprising one or more Cloud PoPs 1204 and one or more Cloud Exchanges. In some implementations, the customer 1203 may interact with the SDN automation engine 1201 using the provided REST API 1205. In some implementations, the customer 1203 may access a portal 1206, which may interact with the API 1205, to provide an interface for the customer 1203 to configure a software-defined network. In some implementations, the portal 1206 provides a graphical user interface (GUI) to configure the software-defined network. Whether through the portal, the API or otherwise, the customer 1203 provides the system 300 with information about the customer's one or more cloud providers (e.g., account information, network settings, etc.).

When the customer 1203 configures a network using either the portal 1206 or the API 1205, the SDN automation engine 1201 may then update the payment and billing provider 1207 with billing information (e.g., costs amount, reference number, billing address, etc.) for the configured network. In some implementations, an e-mail provider 1208 may send an acknowledgement e-mail to the customer 1203 indicating that a software-defined network has been configured. In some implementations, the SDN automation engine 1201 may communicate with the cloud providers' APIs 1209 to connect the software-defined network to one or more of the customer's cloud providers. In some implementations, the cloud provider may send a notification to the customer through the cloud provider portal 1210, i.e., the portal enabled by the cloud provider for the customer. The notification may indicate that the software-defined network is trying to connect the cloud provider. In some implementations, the customer is prompted to accept the connection, and when the customer accepts the connection, the customer is connected to the cloud provider.

Figure 13:
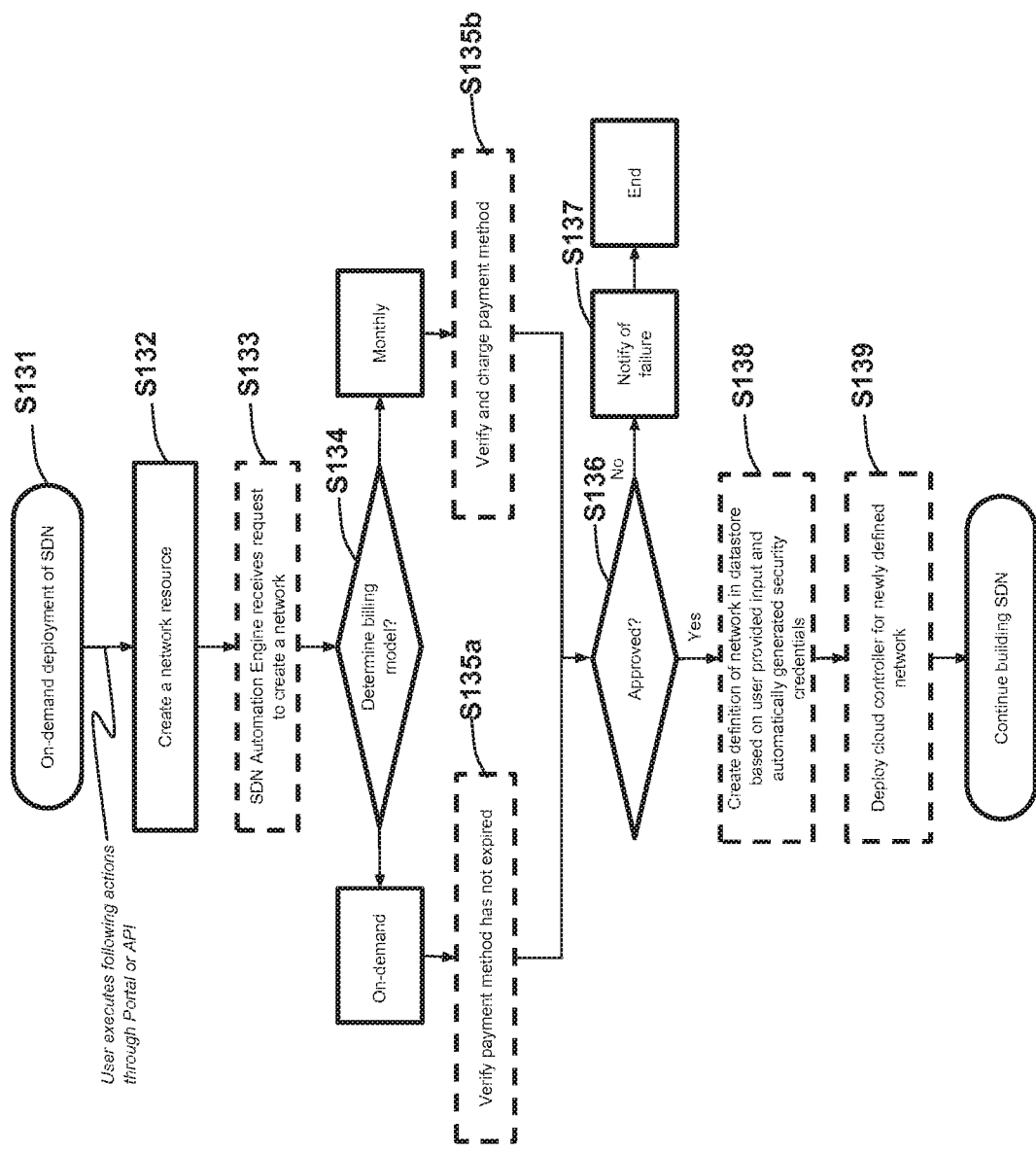
FIG. 13 is a schematic illustration of an example process to create a software-defined network (SDN), according to various implementations.

FIG. 13 schematically illustrates an example of a process to configure a software-defined network (SDN) S131. In step S132, the customer may access the API or the portal to request creation of a SDN network on system 300 and creation of one or more of its resources (e.g., one or more virtual network devices of the customer's SDN). In step S133, the SDN automation engine may receive the request to create the network comprising a SDN network resource. In step S134, the SDN automation engine may determine a billing model as per the customer's request, and interacts with the payment/billing provider (FIG. 11: 1106). In some implementations, the billing may be selected or defined as pay-as-you-go/on-demand for the deployment and use of the network, which billing may be checked for validity in terms of availability to the customer, sufficiency of payment method, etc. at step S135a. In some implementations, the billing may be selected or defined as a monthly charge for the deployment and use of the network, for which the payment method may be checked for validity in terms of availability to the customer, sufficiency of payment method, etc. at step S135b and may be charged or billed where applicable at step S135b. If the payment method in step S135a or the payment in step S135b is not approved, the customer may be notified of the failure in step S137 and further processing may be stopped. If the payment method is valid or the payment goes through, the system may proceed to step S138 where a network definition may be created in the system datastore based on the customer provided inputs and automatically generate security credentials. Then, in step S139, a cloud controller may be deployed for the newly defined network.

Figure 14:
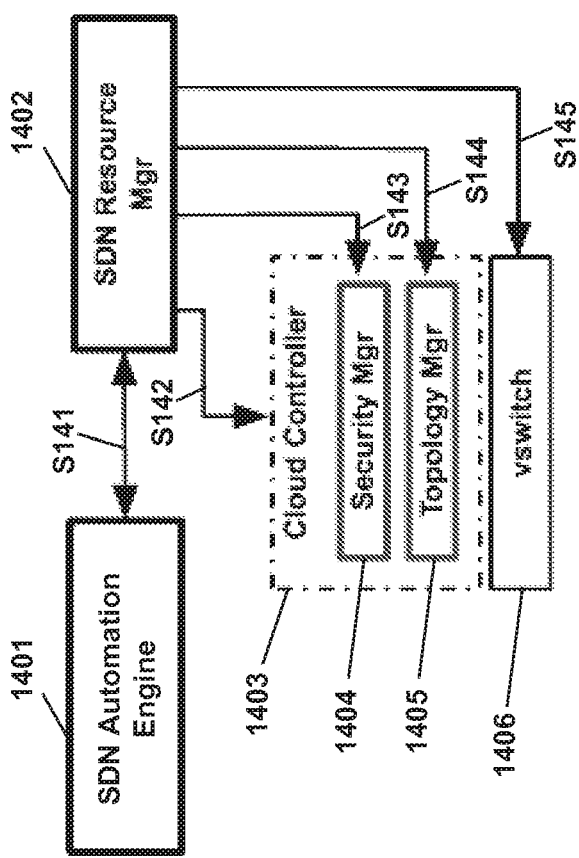
FIG. 14 is a schematic illustration of an example of interactions of various modules of the system to create a software-defined network (SDN), according to various implementations.

FIG. 14 schematically illustrates an example of interactions of various modules of the system to create a software-defined network (SDN). In step S141, the SDN automation engine 1401 may select an appropriate SDN resource manager 1402 and may send it a cloud controller resource control message after which the SDN resource manager 1402 may acknowledge receipt of the control message. In step S142, the SDN resource manager 1402 may allocate a cloud controller 1403 from the pool of device resources (e.g., a pool of cloud controllers) and may configure it for the specific customer network. In step S143, the SDN resource manager 1402 may configure the security manager 1404 with a network specific ID and credentials (e.g. one or more keys). In step S144, the SDN resource manager 1402 may configure the topology manager 1405 with a network specific ID and one or more logical network interfaces. In step S145, the SDN resource manager 1402 may configure the virtual switch 1406 by allocating the vlan, virtual port, and port bandwidth used by the topology manager 1405's one or more logical network interfaces.

Figure 15:
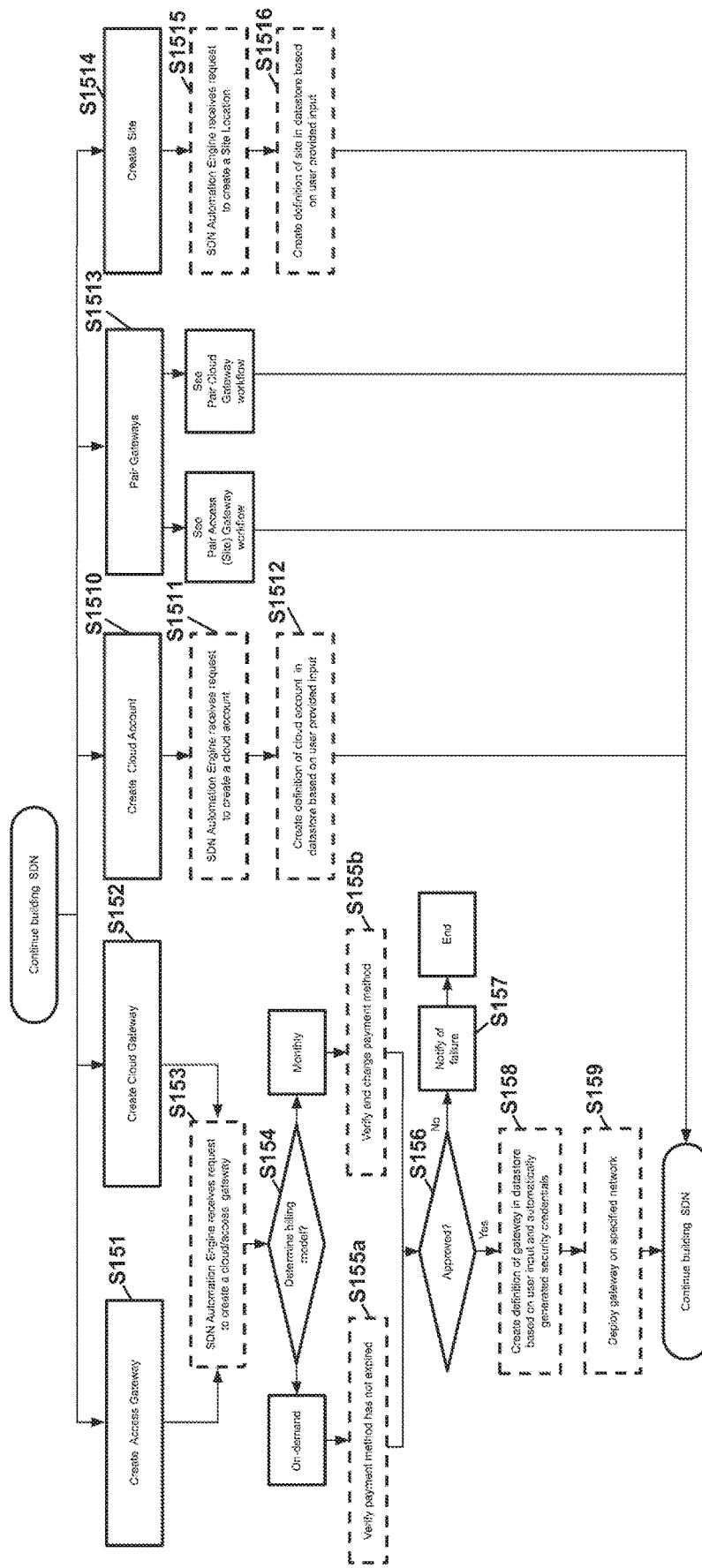
FIG. 15 is a schematic illustration of an example process to create virtual gateways, cloud accounts and sites, according to various implementations.

FIG. 15 schematically illustrates an example of processes to create and deploy various components of a software-defined network (SDN). In some embodiments, processes of creating an access gateway (FIG. 3: 308b) and a cloud gateway (FIG. 3: 308a, 308c) may be similar. In some embodiments, the access gateway resides at a Cloud PoP and the cloud gateway resides at a Cloud Exchange. In an embodiment, the access gateway may be a mobile gateway that connects to one or more customer devices (e.g., smartphones, laptops, etc.) away from the customer site or a site gateway that connects to a customer's site.

In some embodiments, the customer may request an access gateway in step S151 or may request a cloud gateway in step S152. In step S153 the SDN automation engine receives the request to create an access gateway or a cloud gateway. In step S154, the SDN automation engine determines a billing model (e.g., as selected by the customer), and interacts with the payment/billing provider (FIG. 11: 1106). In some implementations, the billing may be pay-as-you-go/on-demand, for which the billing (e.g., payment method) may be checked for validity and/or charged at step S155a. In some implementations, the customer may pay a monthly charge for the deployment of the network, for which the billing (e.g. payment method) may be checked for validity and/or charged at step S155b. If the payment arrangement in step S155a or in step S155b is not approved, the customer may be notified of the failure in step S157 and further processing may be stopped. If the payment arrangement is valid, the system may proceed to step S158 where the definition of a cloud or access gateway may be created in the datastore based on the customer's input and automatically generate security credentials therefor. In step S159, the cloud or access gateway may be deployed on a specified network.

In some implementations, the system may facilitate customers to create cloud accounts with the system 300 and/or their respective cloud providers. In step S1510, a customer may put in a request to create a cloud account through the API or the portal. In step S1511, the SDN automation engine may receive the request to create the cloud account. In step S1512 the SDN automation engine may create a definition of the cloud account in the datastore based on the user provided input.

In some implementations, the system may facilitate the customers to create a site location. A site location may be the network definition of the customer's equipment at a particular location to be connected to the system 300 and may include a specification of a Cloud PoP to which the customer wants to connect the customer's equipment. In step S1514, the customer may put in a request to create a site location. In step S1515, the SDN automation engine receives the request to create the site location. Then, in step S1516, the SDN automation engine creates a definition of the site in a datastore based on the customer provided input.

In some implementations, the system may facilitate the customer to pair an access gateway to the customer's site location and/or pair a cloud gateway to a customer's cloud provider at step S1513. The details of the pairing as described further below.

Figure 16:
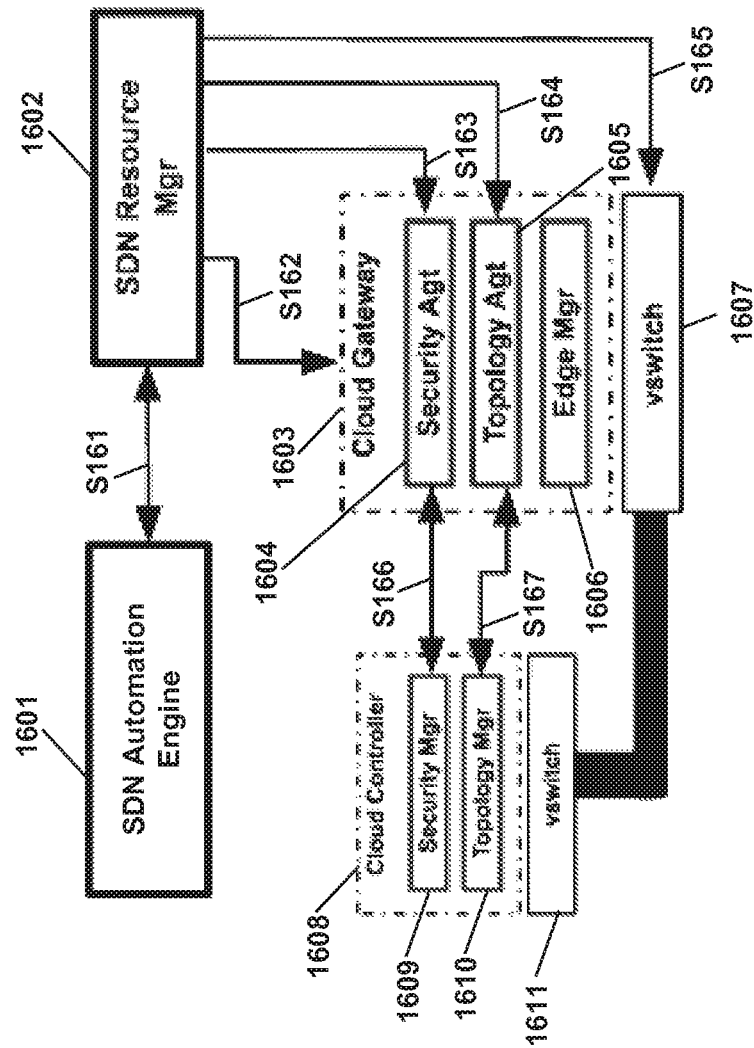
FIG. 16 is a schematic illustration of an example of interactions between various modules of the system to add a new device to the software-defined network (SDN), according to various implementations.

FIG. 16 schematically illustrates an example of interactions between various modules of the system to add a new device to the software-defined network (SDN). In some implementations, the new device is an access gateway. In some implementations, the new device is a cloud gateway.

In step S161, the SDN automation engine 1601 may select an appropriate SDN resource manager 1602 and may send it a create gateway resource control message, after which the SDN resource manager 1602 may acknowledge the receipt of the control message. In step S162, the SDN resource manager 1602 may allocate a gateway resource 1603 from the pool of device resources (e.g., a pool of gateways) and may configure it for the specific customer network. In step S163, the SDN resource manager 1602 may configure the security agent 1604 of the gateway 1603 of the specific customer network with a network specific ID and credentials (e.g., one or more keys). In step S164, the SDN resource manager 1602 may configure the topology agent 1605 of the gateway 1603 of the specific customer network with the network specific ID and one or more logical network interfaces. In step S165, the SDN resource manager 1602 may configure the virtual switch 1607 by allocating the gateway the vlan, virtual port, and port bandwidth size used by the topology agent 1605's one or more logical interfaces. In step S166, the security agent 1604 of the newly added gateway 1603 may attempt to join the network specified by the network ID and the credentials provided. If the provided credentials are valid, the cloud controller security manager 1609 adds the gateway 1603 to the network and updates the topology manager 1610. In step S167, the topology agent 1605 may attempt to establish a secure connection with the topology manager 1610 at the controller 1608.

Figure 17:
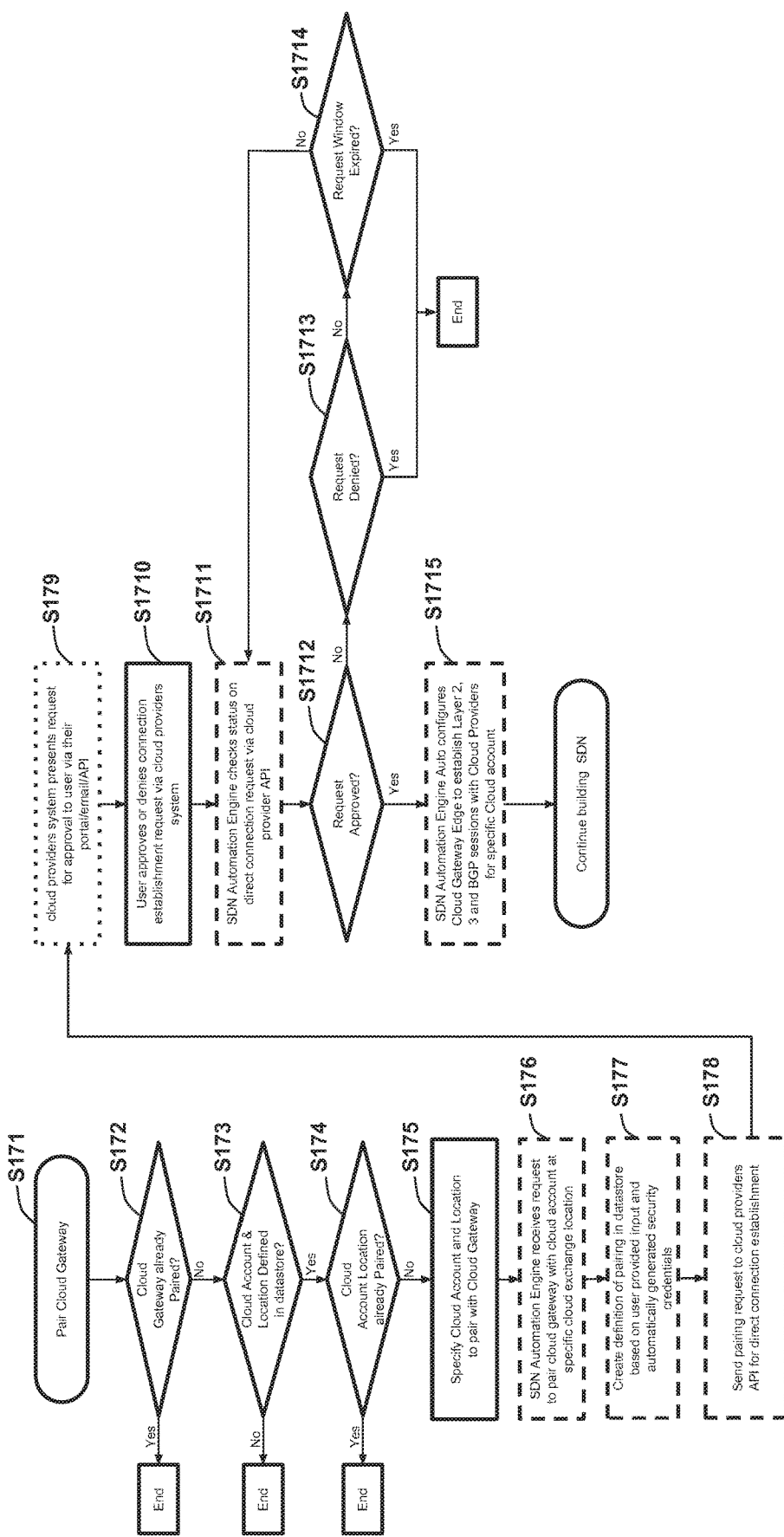
FIG. 17 is a schematic illustration of an example process to pair virtual cloud gateways with cloud providers, according to various implementations.

FIG. 17 schematically illustrates an example of a process of pairing a virtual cloud gateway with a cloud provider. In step S171, the customer may put in a request to pair a virtual cloud gateway with a cloud provider. The SDN automation engine, in step S172, may check whether the gateway is already paired. If already paired, the process may stop. If the virtual cloud gateway and the cloud provider are not already paired, the SDN automation engine in step S173 may check if the customer's account with the cloud provider and the location of the cloud provider (e.g., particular facility of the cloud provider, network settings, etc.) are defined in the datastore. If not so defined, the process may stop. If both the cloud account and the cloud location are defined, the SDN automation engine in step S174 may check if the cloud account location is already paired with a virtual cloud gateway. If so paired, the process may stop. If not paired, the SDN automation engine, in step S175, may request the customer to specify the cloud account and location to pair with the cloud gateway. In step S176, the SDN automation engine may receive the request to pair the cloud gateway with the cloud provider using the cloud account at the specific cloud exchange location, which interfaces with the cloud provider. In step S177, the SDN automation engine may create a definition of pairing in the datastore based on the customer provided input and automatically generate security credentials. In step S178, the SDN automation engine may send a pairing request to the cloud provider API (FIG. 12: 1209) to establish a direct connection of the customer's cloud gateway with the cloud provider's system. The cloud provider's system, in step S179 may present the request for approval to the customer via the cloud provider's portal/API or an email. In step S1710 the customer may either approve or deny the connection establishment request via the cloud provider's system (e.g. API/portal). In step S1711, the SDN automation engine may check the status on the direct connection request via the cloud provider API. If the request is denied, the SDN automation engine may stop the process in step S1713. If the request is not denied and the request window has not expired, the SDN automation engine may periodically check if the customer has approved the direct connection request. If the customer does not approve the direct connection request within the request window, SDN automation engine may stop the process in step S1714. If the customer approves the connection request within the request window, the SDN automation engine may proceed to step S1715 to configure a cloud gateway edge to establish layer 2, layer 3 and border gateway protocol (BGP) sessions with the cloud provider for a specific cloud account.

Figure 18:
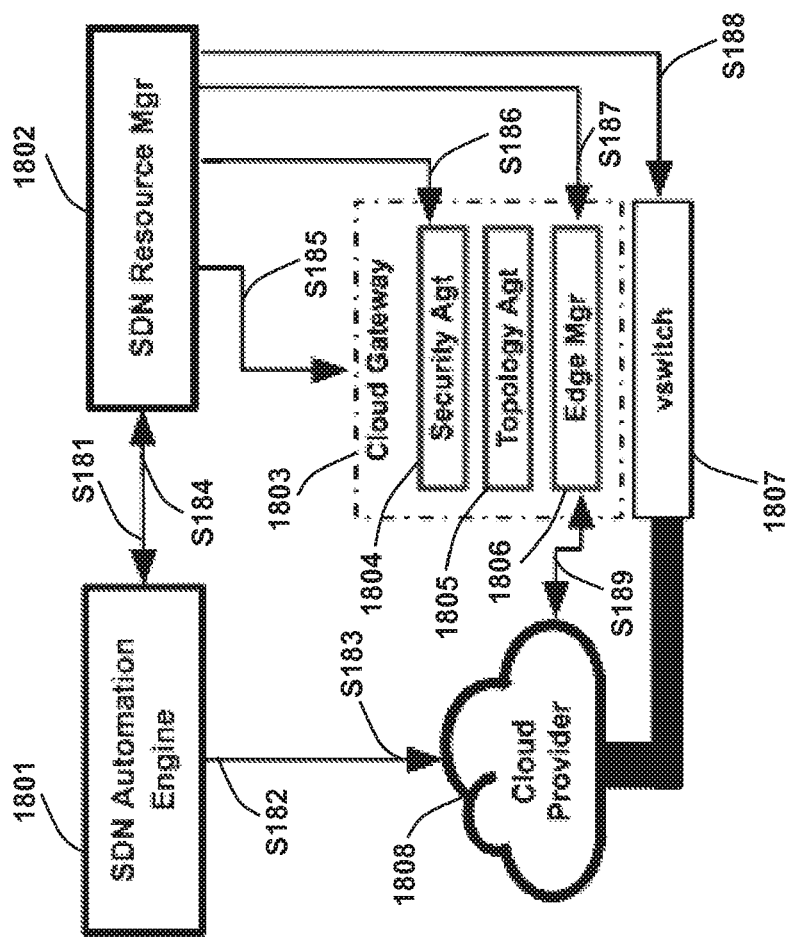
FIG. 18 is a schematic illustration of an example of interactions between various modules of the system to pair a cloud gateway with a cloud provider, according to various implementations.

FIG. 18 schematically illustrates an example of interactions between various modules of the system to pair a cloud gateway with a cloud provider. In step S181, the SDN automation engine 1801 may select an appropriate SDN resource manager 1802 and may send it a pair gateway resource control message, after which the SDN resource manager 1802 may acknowledge the receipt of the control message. In step S182, the SDN automation engine 1801 may send the target cloud provider 1808 API a direct connection establishment request. In step S183, the SDN automation engine 1801 may continue to check the cloud provider 1808 API for the status of the direct connection establishment request. Once direct connection request is approved, SDN automation engine 1801, in step S184, may send a pair approved gateway resource control message to the SDN resource manager 1802. In step S185, SDN resource manager 1802 may update the gateway 1803 by enabling the edge manager 1806. In step S186, the SDN resource manager may update the security agent 1804 in the gateway 1803 with the credentials required for the direct connection device-to-device authentication. In step S187, the SDN resource manager 1802 may update the edge manager 1806 in the gateway 1803 with one or more direct connection routing and logical network interfaces. In step S188, the SDN resource manager 1802 may configure the virtual switch 1807 in the gateway 1803 by allocating the gateway 1803 the vlan, virtual port, and port bandwidth size used by the edge manager 1806's one or more logical interfaces. In step S189, the edge manager 1806 may establish the routing and traffic forwarding session with cloud provider 1808's direct connection network device.

Figure 19:
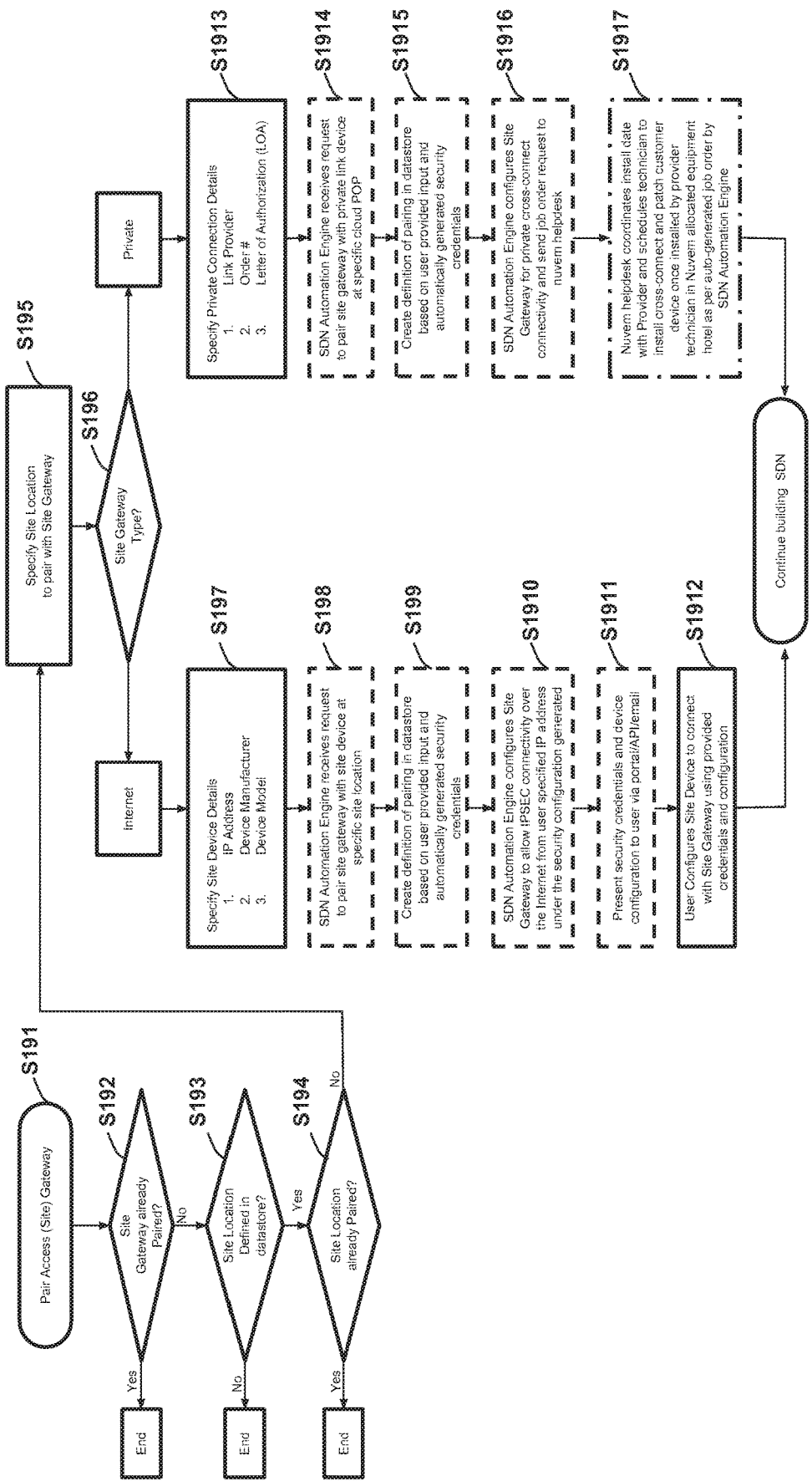
FIG. 19 is a schematic illustration of an example process to pair a virtual access gateway with a customer site, according to various implementations.

FIG. 19 schematically illustrates an example of a process for access gateway pairing. In some implementations, the pairing may be with one or more devices at the customer's site over an internet connection. In some implementations, the pairing may be done through a private connection.

In step S191, a customer may put in a request to pair an access (site) gateway. In step S192, the SDN automation engine may check if the access gateway has already been paired. If paired, the SDN automation engine may stop the process. In step S193, the SDN automation engine may check whether the site location is defined in the datastore. If not defined, the SDN automation engine may stop the process. In step S194, the SDN automation engine may check if the site location has already been paired. If already paired, the SDN automation engine may stop the process. After all the checks are done, the SDN automation engine, in step S195, may prompt the customer to specify the site location to pair with the access gateway. In step S196, the SDN automation engine may check the site gateway type.

In some implementations, the connection to the access gateway may be over the internet. In that case, the SDN automation engine may proceed to step S197 and request the customer to specify, if not already provided, the site equipment details, for example, IP address, device manufacturer, device model, etc. In step S198, the SDN automation engine may receive a request to pair an access gateway with site equipment at a specific site location. In step S199, the SDN automation engine may create a definition of the pairing in the datastore based on the customer provided input and automatically generate security credentials. In step S1910, the SDN automation engine may configure the access gateway to allow connectivity over the internet from the customer specified IP address under the automatically generated security credentials. In step S1911, the SDN automation engine may present the security credentials and device configuration to the customer via the portal/API or an e-mail. In step S1912, the customer may configure the site equipment to connect with the access gateway using the provided credentials and configuration.

In some implementations, the connection to the access gateway may be over a private link. In that case, the SDN automation engine may proceed from step S196 to step S1913 to prompt the customer to provide the connection details. In some implementations the connection details may include the name of the link provider, the order number, and a letter of authorization (LOA) from the link provider. In step S1914, the SDN automation engine may receive a request to pair the access gateway with the private link device at a specific Cloud PoP location. In some implementations, the access gateway may reside at a specific Cloud PoP. In step S1915, the SDN automation engine may create a definition of the pairing in the datastore based on the user provided input and automatically generate security credentials. In step S1916, the SDN automation engine may configure the access gateway for a private connectivity and, where not already set up, send the job order request to the system helpdesk. In step S1917, where needed, the system helpdesk may co-ordinate the install date with the private link provider. In some implementations, the system helpdesk may schedule a technician to install the connection and patch the customer device once installed by the provider technician in the allocated customer hotel in accordance with an automatically-generated job order by the SDN automation engine.

Figure 20:
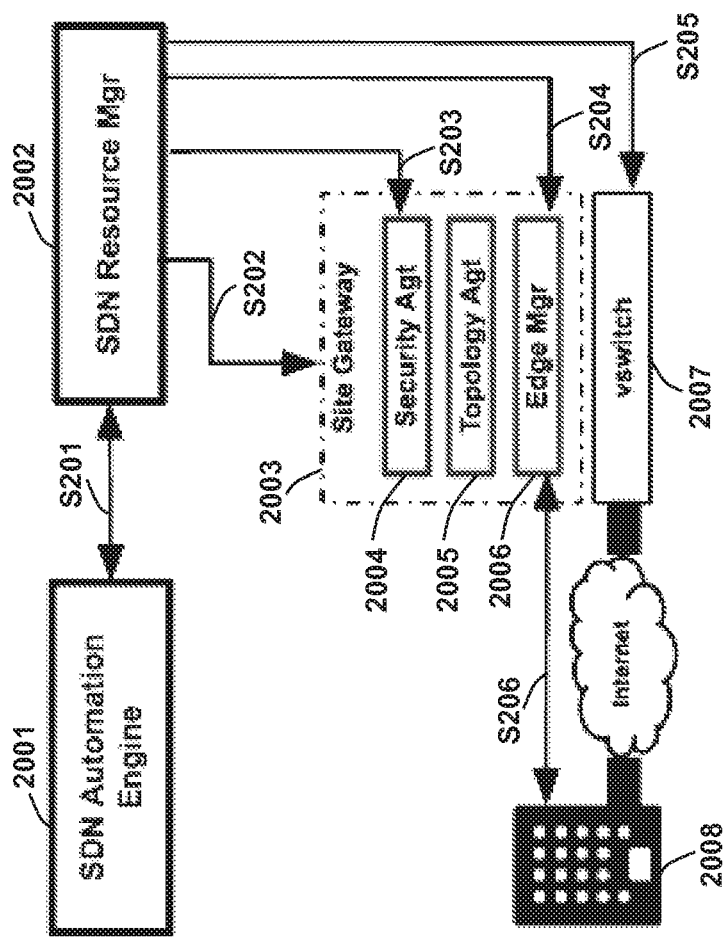
FIG. 20 is a schematic illustration of an example of interactions between various modules of the system to pair an access gateway with a customer's site connection network device, according to various implementations.

FIG. 20 schematically illustrates an example of interactions between various modules of the system to pair an access gateway with a customer's site connection network device. In step S201, the SDN automation engine 2001 may select an appropriate SDN resource manager 2002 and may send it a pair gateway resource control message after which the SDN resource manager 2002 may acknowledge the receipt of the control message. In step S202, the SDN resource manager 2002 may update the access gateway 2003 by enabling the edge manager 2006 in the gateway 2003. In step S203, the SDN resource manager 2002 may update the security agent 2004 in the access gateway 2003 with the credentials required for customer site connection device-to-device authentication. In step S204, the SDN resource manager 2002 may update the edge manager 2006 with the customer site connection information such as the IP address, routing and one or more logical network interfaces. In step S205, the SDN resource manager may configure the virtual switch 2007 in the access gateway 2003 by allocating the access gateway 2003 the vlan, virtual port, and port bandwidth size used by the edge manager 2006's one or more logical interfaces. In step S206, the edge manager 2006 may accept and establish an IPSEC traffic forwarding session with the customer site 2008's connection network device.

Figure 21:
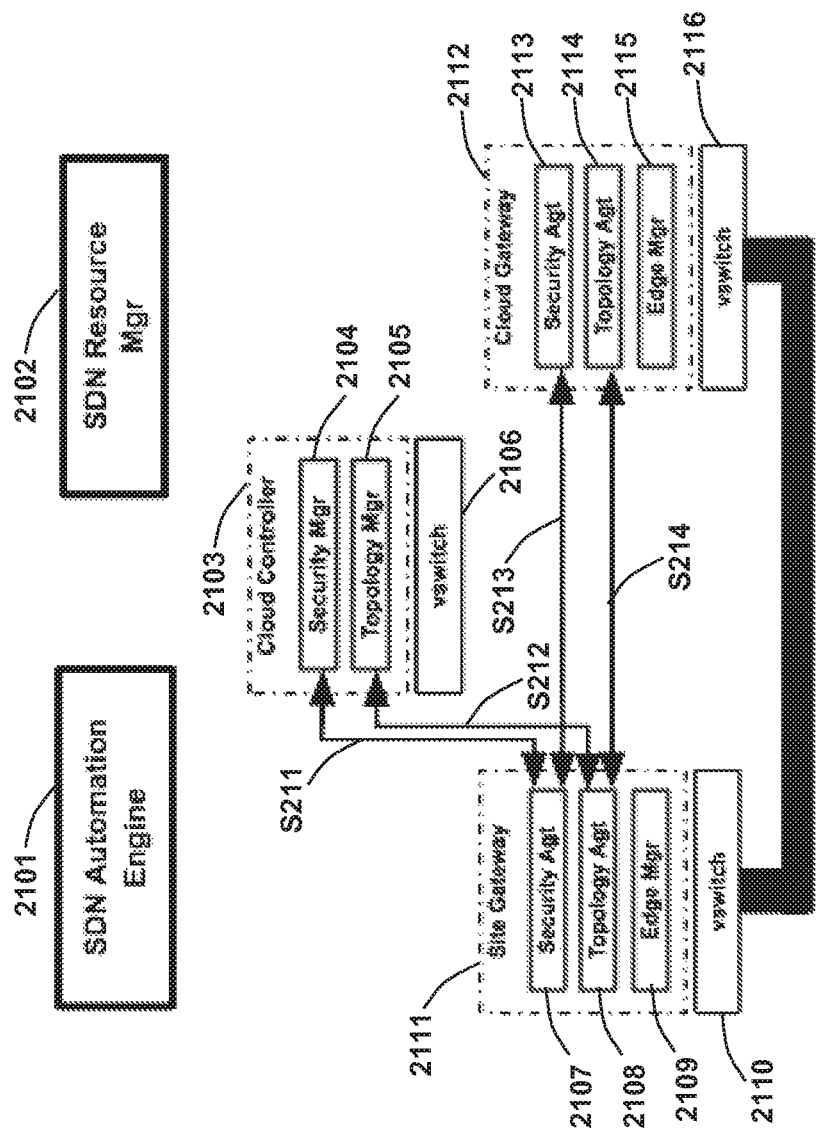
FIG. 21 is a schematic illustration of an example of interactions between various modules of the system to facilitate an initial connection of one virtual network device to another, according to various implementations.

FIG. 21 schematically illustrates an example of interactions between various modules of the system to facilitate an initial connection of one virtual network device to another. In step S211, access gateway 2111 may receive data traffic destined to a specific cloud provider (as determined by the destination IP address that has been mapped to the cloud provider). The access gateway 2111 topology agent 2108 may check its local cache of network resource entries. If no entry is found, access gateway 2111 may send a cloud gateway 2112 resolution request to the security manager 2104 at its controller 2103 and may get an authoritative response of the cloud gateway 2112 providing a transit to the specified cloud provider target IP. In step S212, the access gateway 2111 topology agent 2108 may update its network map based on the master network map entry for the cloud gateway 2112 at the topology manager 2105 on the cloud controller 2103. This entry then may be cached by the topology agent 2108 of the access gateway 2111. In step S213, the access gateway 2111 security agent 2107 may attempt to establish a security session with the security agent 2113 on the target cloud gateway. In step S214, if security session is approved, the access gateway 2111 topology agent may establish a secure logical network connection with the topology agent 2114 on the target cloud gateway 2112 and may send the data traffic through the secure connection. The secure connection may remain established for a configurable amount of time.

Figure 22:
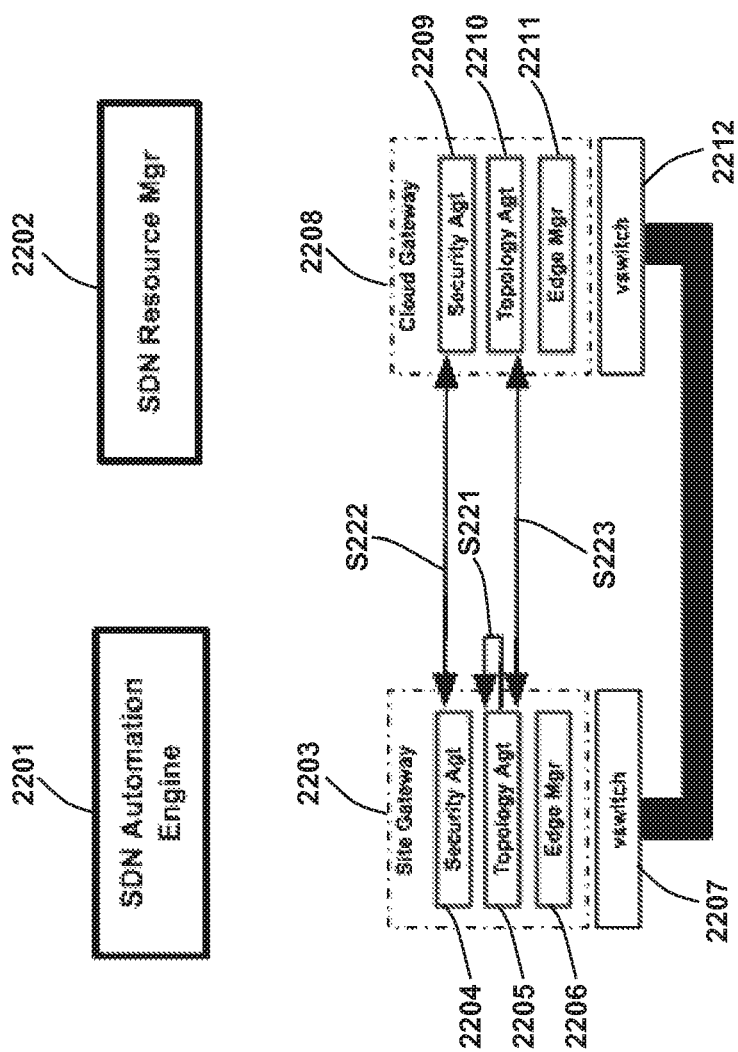
FIG. 22 is a schematic illustration of an example of interactions between various modules of the system to facilitate a cached connection of one virtual network device to another, according to various implementations.

FIG. 22 schematically illustrates an example of interactions between various modules of the system to facilitate a cached connection of one virtual network device to another. In step S221, access gateway 2203 may receive data traffic destined to a specific cloud provider (as determined by the destination IP address that has been mapped to the cloud provider). The access gateway 2203 topology agent 2205 then may check its local cache of network resource entries. In step S222, if a cloud gateway entry is found, the access gateway 2203 security agent 2204 may attempt to establish a security session with the security agent 2209 on the target cloud gateway 2208. In step S223, if security session is approved, the access gateway 2203 topology agent 2205 may establish a secure logical network connection with the topology agent 2210 on the target cloud gateway 2208 and may send the data traffic through the secure connection. The secure connection may remain established for a configurable amount of time.

In some implementations the configured SDN may be a remote access network. In some implementations, the configured SDN may be a wide area network. In some implementations, the configured SDN may be a cloud bridge network. A cloud bridge network allows traffic to go between different cloud provider equipment (e.g., between cloud provider equipment of different cloud providers and/or geographically spaced cloud provider equipment of the same cloud provider) without the traffic having to pass through the customer. In some implementations, the configured SDN may be a consumer virtual private network. In some implementations, the configured SDN may be a cloud federation network. A cloud federation network allows the customer connecting from one or more locations to be connected to two or more cloud providers with a connection to at least one of the cloud providers being live. The network thus allows a customer to switchover or failover to a different cloud provider or optionally use both cloud providers at the same time.

In some implementations, a customer may access the software-defined network from a personal or mobile device. In some implementations, a customer may access the software-defined network from a device at different locations.

To provide security while, for example, simplifying the user experience, a client application may be provided in collaboration with the automation engine that implements a security process to provide secure access by a user to a customer's network using virtually any device at a location of the user's choice. In an embodiment, the security process provides dynamic access to the customer's network using one or more of the following factors: a user login associated with the access device, a device key associated with the access device, a bio-factor or other authorization information pass/fail associated with the token device, geolocation of the token device at time of session initiation/reestablishment/periodic interval, and/or a correct one-time personal identification code (e.g., a PIN) from the access device. In an embodiment, all of the above factors are used. By using a plurality of factors and different types of factors, improved security may be provided.

In an embodiment and at a high level, the process may involve a user login associated with the access device at the time of installation of the client application to allow the user to be known without having to supply user credentials at every session initiation. A device key that uniquely identifies the access device and its associated user login may be auto generated at the time of installation and may never be revealed to the end user, thus removing it as a factor that the end user has to actively manage.

Further, a one-time personal identification code ("OTP") may be automatically sent to the user on a registered token device (e.g., a cell phone) in response to the user normally interacting with the user's network (e.g., start an application desired to be accessed). The OTP sent to the token device may be hidden and may require that the user reveal it by providing a bio-factor or other authorization information (e.g., bio-factor or other authorization information may be locally supported on the token device). Upon revealing the OTP, the user simply enters the OTP in the provided input box on the access device or if the access device is the token device, the token device may be given access without the user entering the OTP. Further, a geolocation factor may be automatically provided by the token device upon successful bio-factor or authorization information validation.

So, from the user perspective, the user simply activates an application. If a current session is not present or the current session is about to expire, the user enters the automatically provided OTP after it has been revealed on the token device or the device automatically processes the OTP to give access. The resulting user experience is one where the user is asked to enter only a single factor (OTP) or is not required to enter one at all, but the system may be secured by a plurality of factors (e.g., 5 factors).

Unlike traditional VPN clients that require username and password credentials separate from the computer and/or mobile device that the VPN client runs on, the system herein, in an embodiment, relies on the operating system's underlying credentials/key management subsystem. That is, as noted above, at time of installation of the client application on the access device, the user approves the installation through the native operating system security credential subsystem. If the user properly authenticates at time of install, a unique device key is generated that is used only by that installation on that access device specific to that user's login. This unique device key is associated with the user's login on the customer's network. So, after the user logs into the access device and after the client application is started (which may run in the background like other login processes), the client application authenticates in the background by sending the unique device key to the automation engine. If the client application is successfully authenticated (e.g. the device has not been revoked), the client application will continue running (e.g., in the background) awaiting a VPN connection request to the customer's network. On a mobile device, the client application may not operate in the background, but may be initiated on demand based on the user attempting to access the customer's network. The client application may use the mobile device's native per APP VPN technology.

In an embodiment, and as alluded to above, the system employs a secure hidden or locked personal identification code process. For an access device that is not a registered token device (e.g., a desktop), the user is sent a hidden OTP that the user must reveal to him or herself by means of a bio-factor or other authentication information supplied at the token device, and which in an embodiment is processed for pass/fail at the token device. The revealed OTP is then used (e.g., manually input) at the access device. For an access device that is also the token device, the user is sent an OTP that the user unlocks by means of a bio-factor or other authentication information supplied at the token device, and which in an embodiment is processed for pass/fail at the token device. The unlocked OTP may then be automatically processed at the token device. This simple method helps prevent unauthorized access in cases where both the access device and token device are in the possession of an unauthorized user and helps prevents unauthorized access in cases where the access device and token device are one in the same.

When the access device is the token device as noted above, the system still employs multiple factors despite the user only being required to unlock a hidden OTP. For example, one or more of the following factors may be used: a user login associated with the access device, a device key associated with the access device, a bio-factor or other authorization information pass/fail associated with the token device, and/or a geolocation of the token device at time of session initiation/reestablishment/periodic interval.

Further, in an embodiment, the system may provide a relatively quick session reestablishment. In a situation with an existing session that times out or is otherwise interrupted or disconnected, unlike traditional methods that require the user to reenter the username and password, the client application may employ a simple end user process where the user is simply asked to provide or unlock, depending on the access device, a new OTP. This method, while extremely simple, still benefits from the protection of the secure hidden personal identification code process and device based multifactor geo-dependent access control.

Figure 23:
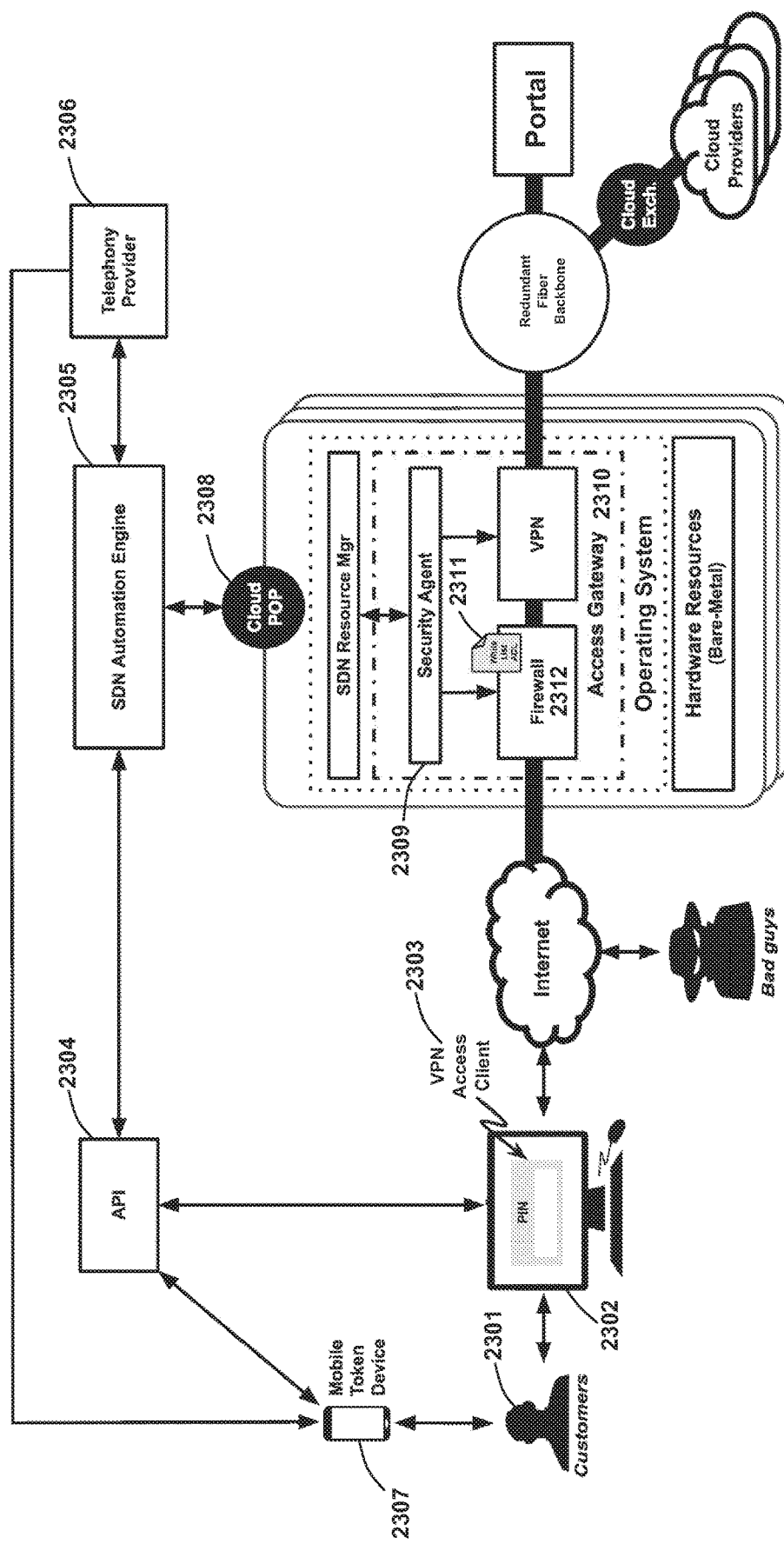
FIG. 23 is a schematic illustration of an example system to provide multi-factor geo-dependent virtual private network (VPN) access control on a non-token device, according to various implementations.

FIGS. 23-25 schematically illustrate an example of a process by which customers can access their network via VPN using virtually any device at a location of their choice.

Figure 24A:
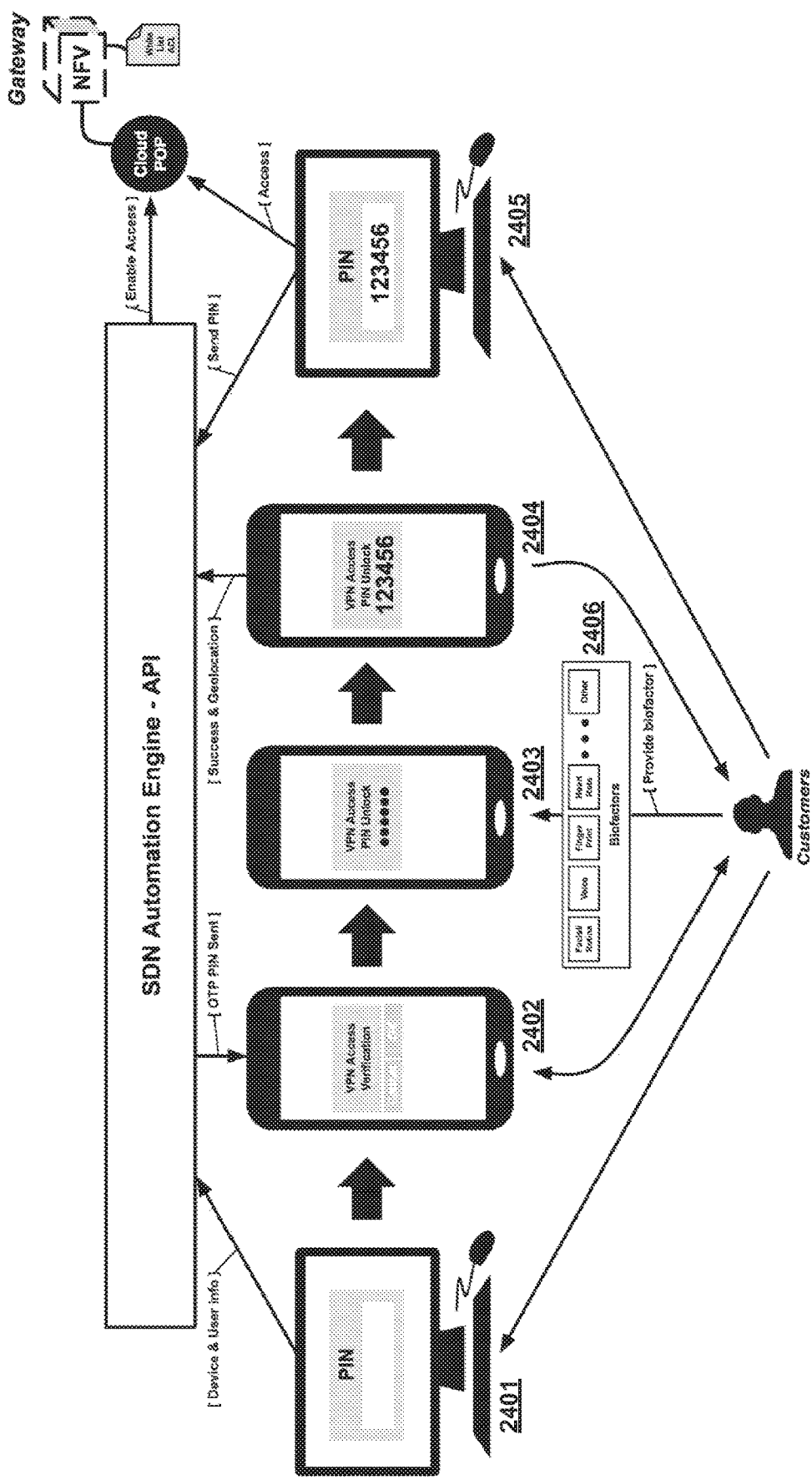
FIGS. 24(A) and 24(B) are schematic illustrations of an example process to provide multi-factor geo-dependent virtual private network (VPN) access control on a non-token device, according to various implementations.
Figure 24B:
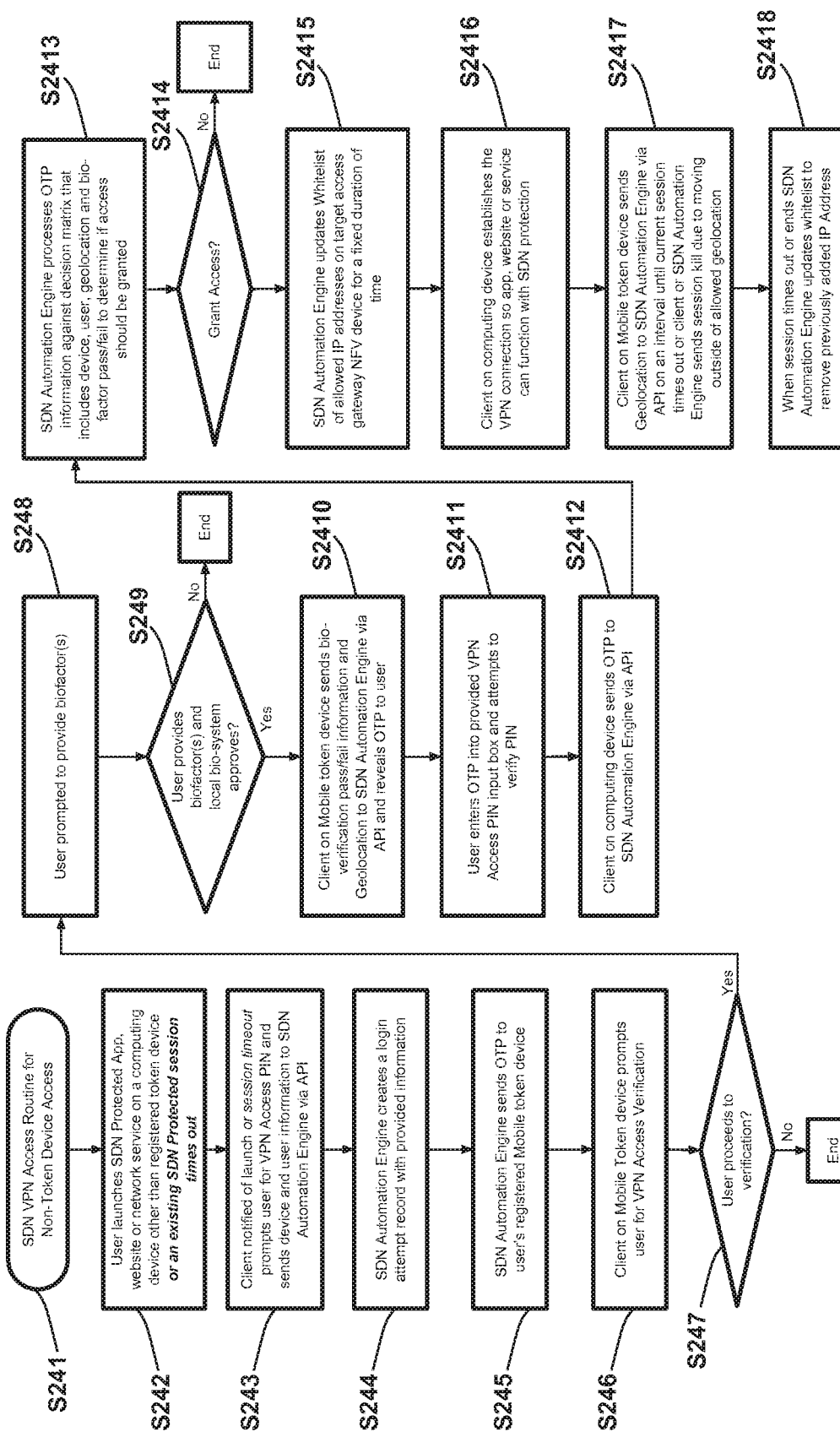

FIGS. 23, 24(A), and 24(B) schematically illustrate an example of a process by which customers can access their network via VPN on a computing device other than a registered token device the token device, at a location of their choice. The process in FIGS. 24(A) and 24(B) is described referencing elements illustrated in FIG. 23.

In step S242, a customer 2301 may launch a SDN protected application, website or network service on a computing device 2302 (FIG. 24(A): 2401) that is other than a registered token device 2307 (a registered token device being a device configured to receive the token described herein and registered with the system to receive the token; typically such a device would be a mobile device, e.g., a mobile phone). In some implementations, the process of non-token device access may start after an existing SDN protected session times out. In step S243, a client program 2303 running on the customer's personal device 2302 may get notified that the protected application, website or network service has been launched; or that an existing session has timed out. The client 2303 may prompt the customer 2301 for a VPN access code and may send the device and customer information to the SDN automation engine 2305 via the API 2304 (FIG. 24(A): 2401). In step S244, the SDN automation engine 2305 may create a login attempt record with the provided information. In step S245, the SDN automation engine may send a one-time personal identification code ("OTP"), through, e.g., a telephony provider 2306, to the customer's registered token device 2307. In step S246, a client running on the token device 2307 may prompt the customer 2301 for VPN access verification (FIG. 24(A): 2402). If the customer 2301 does not proceed to verification in step S247, the process may stop. If the customer 2301 proceeds to verification, the customer in step S248 may be prompted to provide a bio-factor or other authentication information to the token device 2307 to unlock the OTP (FIG. 24(A): 2403). In some implementations, the bio-factor may include a fingerprint, a retina, a face, a voice, a heart-rate, etc. (FIG. 24(A): 2406). If the customer does not provide the bio-factor or other authentication information or the provided bio-factor or other authentication information is not approved at step S249 by, e.g., the bio-factor or other authentication information evaluation system in the token device 2307 or located elsewhere, the process may stop. If the customer provides the bio-factor or other authentication information and it is approved, the system proceeds to step S2410 where the client running on the token device 2307 may send the bio-verification or other authentication information pass/fail and geolocation information to the SDN automation engine 2305 via the API 2304 (FIG. 24(A): 2404). The client may also reveal the OTP to the customer (FIG. 24(A): 2404). In step S2411, the customer may enter the OTP into the provided box in the VPN access client 2303 (FIG. 24(A): 2405). In step S2412, the client 2303 on the computing device 2302 may send the OTP to the SDN automation engine 2305 via the API 2304 (FIG. 24(A): 2405). In step S2413, the SDN automation engine may process the OTP information against the decision matrix that includes device 2302 information, customer 2301 information, geolocation information and bio-factor or other authentication information pass/fail to determine if the access should be granted. If the decision is made to grant access in step S2414, the system may proceed to step S2415, or else the process may stop.

In step S2415, the SDN automation engine may interact with a security agent 2309 at a virtual access gateway 2310 residing at a Cloud PoP 2308. The security agent 2309 may add the IP address of the customer's device 2302 (e.g. a laptop) to its whitelist 2311 for a fixed duration of time. In step S2416, the client 2303 on the computing device 2302 establishes a VPN connection so that the application, website or network service may function on the SDN.

In some implementations, the authentication for the connection may be session specific and may be terminated after a certain amount of time and the authentication process may have to be started all over again. In some implementations, the connection may be terminated after the IP address of the customer's device 2302 changes. In some implementations, SDN automation engine 2305 may receive the geolocation of the token device 2307 periodically. If the geolocation of the token device 2307 is not within any one or more geographically defined areas associated with the target access gateway, the connection may be terminated. For example, the authentication to access the SDN might be within a one-mile (or other amount) radius of the present location. If the token device 2307 moves outside that radius, the authentication may be terminated and the customer may have to start the authentication process again. In some implementations, when the session times out or ends, the SDN automation engine may update the whitelist 2311 to remove the previously added IP address of the device 2302. This provision of a limited authentication helps ensure that the SDN is secure.

Figure 25A:
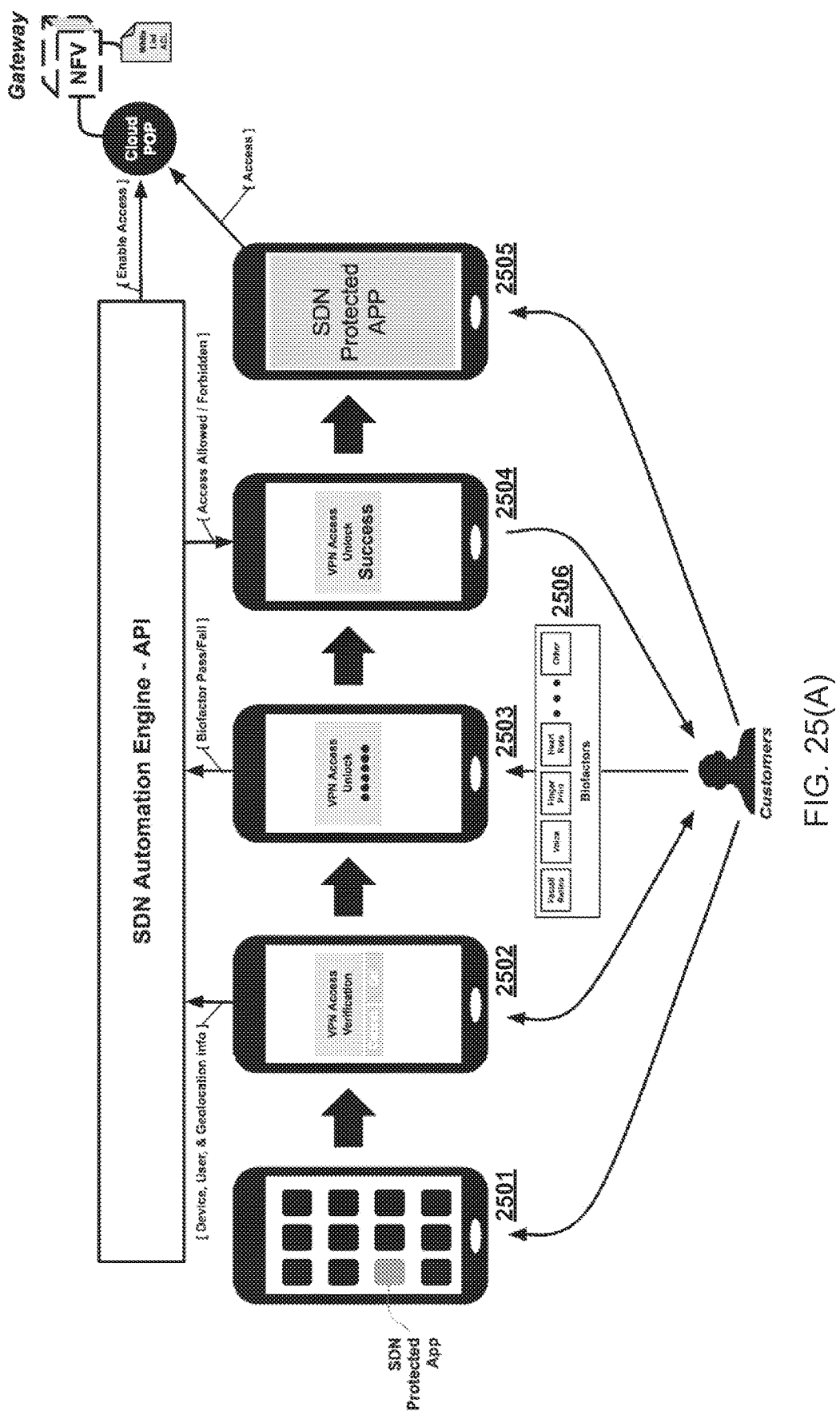
FIGS. 25(A) and 25 (B) are schematic illustrations of an example process to provide multi-factor geo-dependent virtual private network (VPN) access control on a token device, according to various implementations.
Figure 25B:
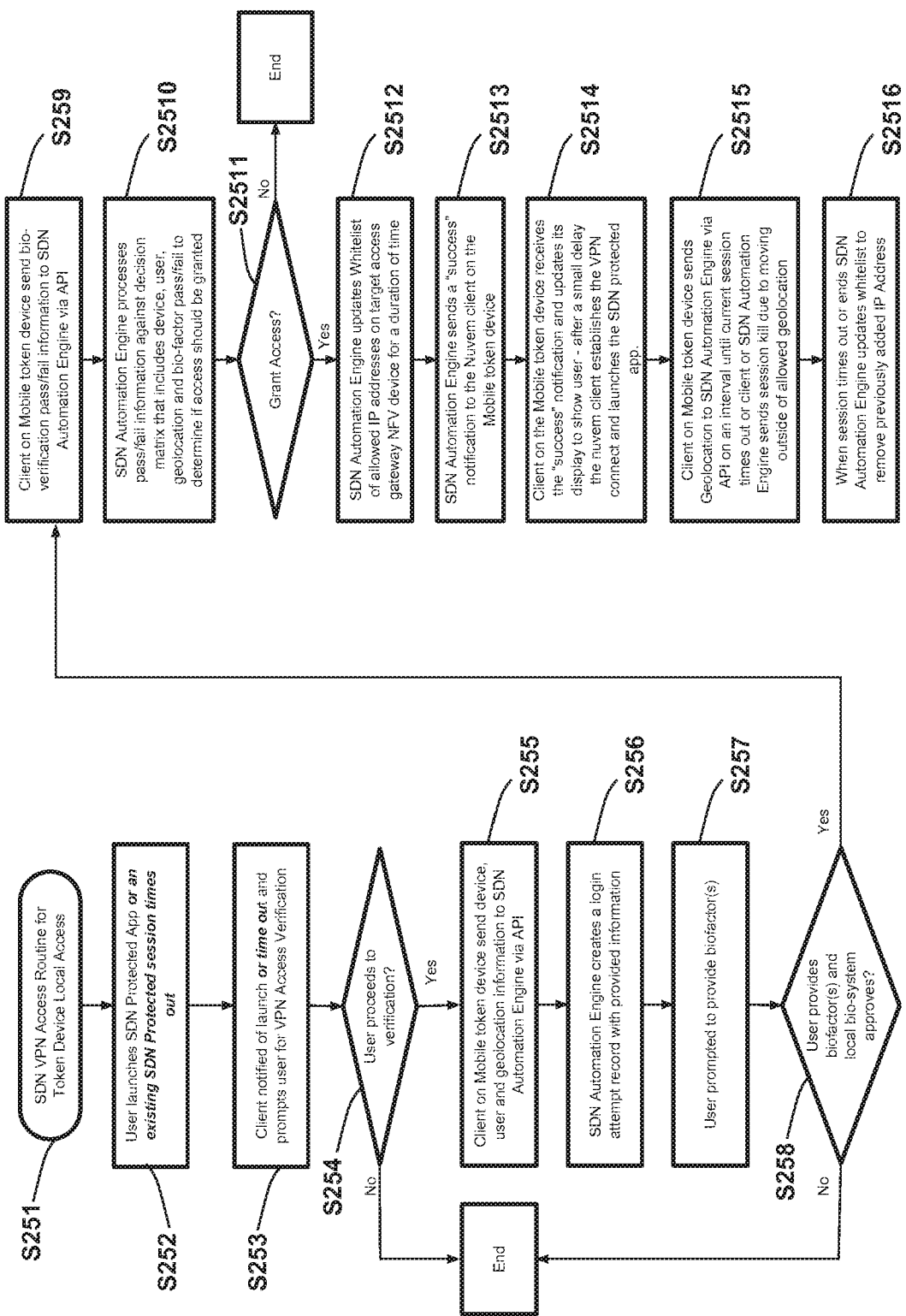

FIGS. 23, 25(A), and 25(B) schematically illustrate an example of a process by which customers can access their network via VPN on the token device at a location of their choice. The process in FIGS. 25(A) and 25(B) is described referencing elements illustrated in FIG. 23. In some implementations, a customer 2301, in step S252, may launch a SDN protected application on the token device 2307 (FIG. 25(A): 2501). In some implementations, the process may start after the SDN protected session times out. In step S253, a client on the token device 2307 may be notified of the launch of the protected application or the timeout of an existing session. The client may then prompt the customer 2301 for VPN access verification (FIG. 25(A): 2502). If the customer 2301 does not proceed to verification in step S254, the process may stop. If the customer 2301 proceeds to verification, the client on the token device 2307, in step S255 may send the customer device and geolocation information to the SDN automation engine 2305 via the API 2304 (FIG. 25(A): 2502). In step S256 the SDN automation engine 2305 may create a login attempt record with the provided information. In step S257, the customer 2301 may be prompted to provide a bio-factor or other authentication information (FIG. 25(A): 2503). In some implementations, the bio-factor may include a fingerprint, a retina, a face, a voice, a heart-rate, etc. (FIG. 25(A): 2506). If the customer 2301 does not provide the bio-factor or other authentication information or the provided bio-factor or other authentication information is not approved by, e.g., the bio-factor or other authentication information authentication system on the token device 2307 or located elsewhere, the process may stop. If the customer 2301 provides the bio-factor or other authentication information and it is approved, the system proceeds to step S259 where the client running on the token device 2307 may send the bio-verification or other authentication information pass/fail and the geolocation information to the SDN automation engine 2305 via the API 2304 (FIG. 25(A): 2503).

In step S2510, the SDN automation engine 2305 may process the pass/fail information against the decision matrix that includes device 2307's information, customer 2301's information, geolocation and bio-factor or other authentication information pass/fail to determine if the access should be granted. If the decision is made to grant access in step S2511, the system may proceed to step S2512, or else the process may stop.

In step S2512, the SDN automation engine 2305 may update the whitelist 2311 on the target access gateway 2310 with the IP address of the token device 2307 for a duration of time. In step S2513, the SDN automation engine 2305 may send a "success" notification to the client running on the token device 2307 (FIG. 25(A): 2504). In step S2514, the client running on the token device 2307 may receive the "success" notification and may show it to the customer 2301 (FIG. 25(A): 2504). The client running on the token device 2307 may then establish the VPN connection with the target access gateway 2310 and may launch the SDN protected application (FIG. 25(A): 2505).

In some implementations, the authentication for the connection may be session specific and may be terminated after a certain amount of time and the authentication process may have to be started over again. In some implementations, the connection may be terminated after the IP address of the token device 2307 changes. In some implementations, SDN automation engine 2305 may receive the geolocation of the token device 2307 periodically. If the geolocation of the token device 2307 is not within any one or more geographically defined areas associated with the target access gateway, the connection may be terminated. For example, the authentication to access the software-defined network might be within a one-mile radius of the present location. If the token device 2307 moves outside the radius, the authentication may be terminated and the customer 2301 may have to start the authentication process over again. In some implementations, when the session times out or ends, the SDN automation engine 2305 may update the whitelist 2311 to remove the previously added IP address of the token device 2307.

Figure 26:
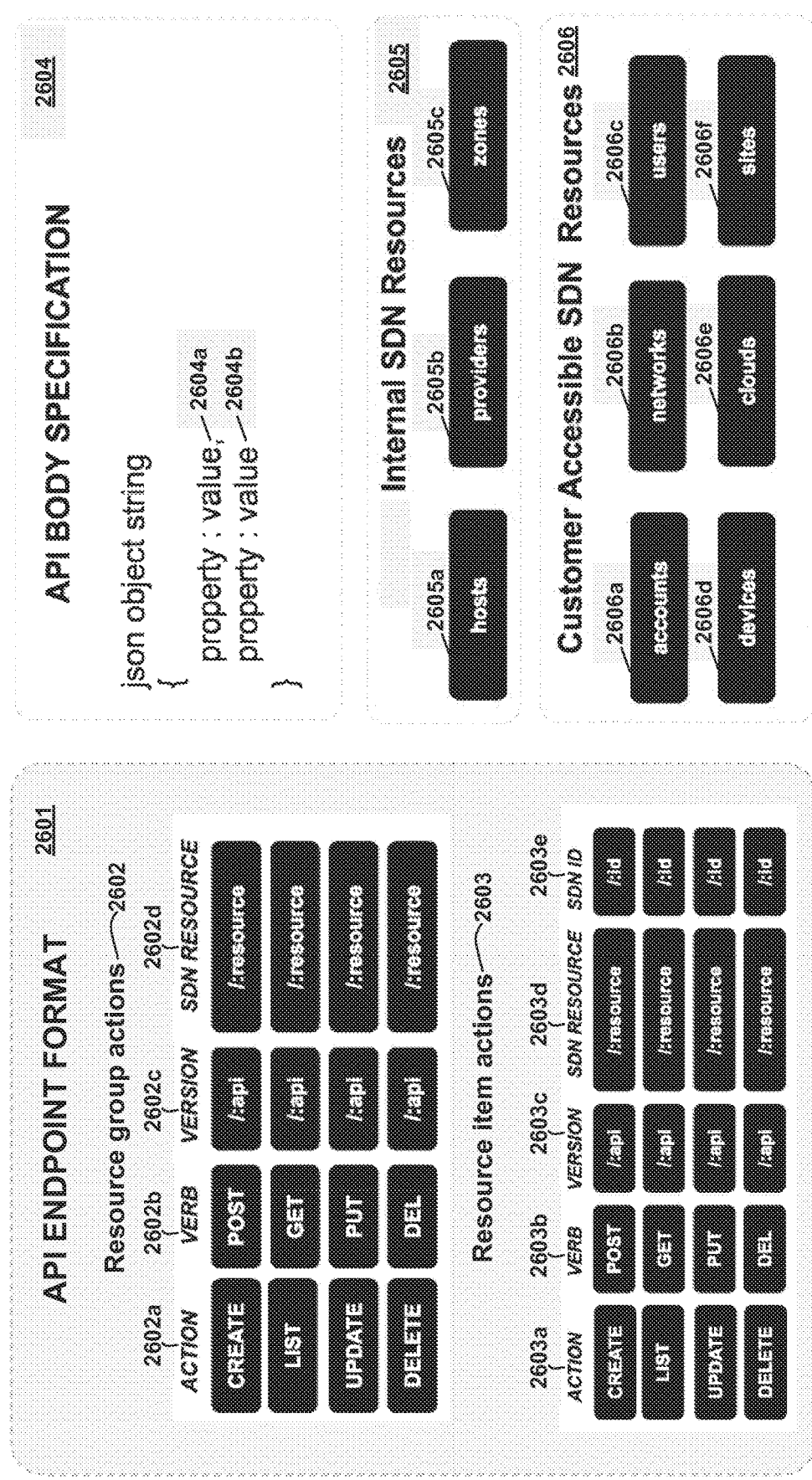
FIG. 26 is a schematic illustration of an example system API of the system, according to various implementations.

FIG. 26 schematically illustrates an example of the system API provided for the system 300. In some implementations, the API may provide actions via the API against certain resources associated with the software-defined network (SDN) in the system 300. In some implementations, the resources may comprise internal resources 2605 as seen by the SDN automation engine and/or administrators of the SDN automation engine. For example, internal resources 2605 may comprise one or more hosts 2605a, which are sub-zones within Cloud Exchanges and Cloud PoPs. The internal resources 2605 may comprise one or more cloud providers 2605b. The internal resources 2605 may comprise one or more zones 2605c. In some implementations, the resources may comprise customer accessible SDN resources 2606, which are available for access by the SDN automation engine and/or administrators of the SDN automation engine as well as one or more customers. For example, the customer accessible SDN resources 2606 may comprise one or more accounts 2606a, one or more networks 2606b, one or more users 2606c, one or more devices 2606d, one or more clouds 2606e, and one or more sites 2606f. As will be appreciated, particular customers may be restricted to particular one or more customer accessible resources.

In some implementations, the API may provide resource group actions 2602. The API user may use the group actions 2602*a* to create, list, update, and delete a group of items of a particular target resource 2602*d* (such as one or more of resources 2605 and/or resources 2606 depending on access privileges) associated with the software-defined network (SDN) in the system 300. In some implementations, the API user may use the POST method 2602*b* to create a number of items of a particular resource 2062*d* (e.g., create a group of one or more network controllers and/or one or more gateways). In some implementations, the API user may use the GET method 2602*b* to retrieve a group of items of a particular resource 2602*d* (e.g., obtain list of a group of one or more network controllers and/or one or more gateways). In some implementations, the API user may use the PUT method 2602*b* to modify/replace a group of items of a particular resource 2602*d*. In some implementations, the API user may use the DEL method 2602*b* to delete a group of items of a particular resource 2602*d*.

In some implementations, the API may provide resource item actions 2603. The API user may use the item actions 2603*a* to create, list, update, and delete one or more specific items of a target resource 2603*d* (such as one or more of resources 2605 and/or resources 2606 depending on access privileges), which specific items are identified by the SDN ID 2603*e*. In some implementations, the API user may use the POST method 2603*b* to create a specific item of a resource 2603*d* identified by the SDN ID 2603*e* (e.g., create the network controller or gateway in the SDN denoted by the SDN ID 2603*e*). In some implementations, the API user may use the GET method 2603*b* to retrieve a particular item of resource 2603*d* identified by SDN ID 2603*e*. In some implementations, the API user may use the PUT method 2603*b* to modify/replace a particular item of resource 2603*d* denoted by SDN ID 2603*e*. In some implementations, the API user may use the DEL method 2603*b* to delete an item of resource 2603*d* denoted by SDN ID 2603*e*.

Thus, in an embodiment, in the case of an API call using a group action 2602*a*, the API user merely needs to specify the appropriate method 2602*b* and the desired target resource 2602*d*. Optionally, the API user may specify the API version 2602*c* in the call. Optionally and/or where necessary, the API user would further specify in the API body 2604 one or more parameters and, optionally, one or more associated values, associated with the API call (e.g., a date parameter and date range associated therewith for a GET method). In some implementations, the body specification 2604 may be in the form of JavaScript Object Notation.

In an embodiment, in the case of an API call using an item action 2603*a*, the API user merely needs to specify the appropriate method 2603*b*, the desired target resource 2603*d* and the SDN ID 2603*e* for the particular item of the resource 2603*d*. Optionally, the API user may specify the API version 2603*c* in the call. Optionally and/or where necessary, the API user would further specify in the API body 2604 one or more parameters and, optionally, one or more associated values, associated with the API call (e.g., a date parameter and date range associated therewith for a GET method). In some implementations, the body specification 2604 may be in the form of JavaScript Object Notation.

Thus, an API user may be provided a very simple API that enables a wide gamut of operations in association with the software-defined network (SDN) in the system 300.

In an embodiment, there is provided a hosting system to facilitate a customer of an operator of the system to connect to a cloud provider, the system comprising: a first cloud exchange co-located with and connected to first cloud provider equipment; a second cloud exchange co-located with and connected to second cloud provider equipment, wherein the first cloud provider equipment and the second cloud provider equipment are of a same cloud provider but at different geographically spaced locations or the first cloud provider equipment is of a different cloud provider than that of the second cloud provider equipment, and wherein the first cloud exchange is connected to the second cloud exchange; and a non-transitory computer readable medium comprising computer program instructions, the instructions configured to facilitate the configuration of a software-defined network including the first cloud exchange and/or second cloud exchange, wherein the network connects the customer to the first cloud provider equipment and/or the second cloud provider equipment.

In an embodiment, the system further comprises a customer point of presence configured to allow the customer to connect to the first cloud exchange and/or the second cloud exchange. In an embodiment, the customer point of presence is configured to provide a private connection for the customer. In an embodiment, the customer point of presence hosts networking equipment of the customer. In an embodiment, the customer point of presence is configured to provide an internet connection to the customer. In an embodiment, the computer program instructions are further configured to provide a web portal to the customer for the customer to configure the network. In an embodiment, the computer program instructions are further configured to provide an application programming interface to the customer for the customer to configure the network. In an embodiment, the configured network comprises a cloud bridge network or a cloud federation network. In an embodiment, the computer program instructions are further configured to make available a plurality of virtual networking devices for use by the customer. In an embodiment, the computer program instructions are further configured to receive a specification of the network from the customer, wherein the network includes the plurality of virtual networking devices. In an embodiment, the specification of the network comprises a network topology of the plurality of virtual networking devices. In an embodiment, at least one of the virtual networking devices comprises a network controller or a gateway. In an embodiment, at least one of the virtual networking devices is localized in a bare-metal hardware resource of a sub-zone within a customer point of presence. In an embodiment, at least one of the virtual networking devices is localized in a bare-metal hardware resource of a sub-zone within the first cloud exchange and/or second cloud exchange. In an embodiment, at least one of the virtual networking devices is container based. In an embodiment, at least two of the plurality of virtual networking devices are redundant and on two different sub-zones of the first cloud exchange, of the second cloud exchange and/or of a customer point of presence. In an embodiment, the system comprises the first cloud provider equipment and the second cloud provider equipment being of the same cloud provider but at different geographically spaced locations. In an embodiment, the system comprises the first cloud provider equipment being of a first cloud provider different than a second cloud provider of the second cloud provider equipment. In an embodiment, the computer program instructions are further configured to allow the customer to include the first and second cloud providers in the customer's network and/or to switch between the first and second cloud providers. In an embodiment, the first cloud exchange is connected to the second cloud exchange by a redundant fiber backbone. In an embodiment, the computer program instructions are further configured to allow the customer to create a plurality of software-defined networks, each software-defined network of the plurality of software-defined networks including the first cloud exchange and/or second cloud exchange. In an embodiment, the computer program instructions are further configured to interact with a cloud provider application programming interface to connect the software-defined network to the first cloud provider equipment and/or the second cloud provider equipment and/or to manage network traffic from the software-defined network to the first cloud provider equipment and/or the second cloud provider equipment. In an embodiment, the computer program instructions are further configured to allow access to the network based upon multi-factor authentication and geolocation information. In an embodiment, the computer program instructions are further configured to provide a personal identification code to a token device, wherein the personal identification code is hidden or locked at the token device until authorization information is provided at the token device. In an embodiment, the computer program instructions are further configured to provide a personal identification code and to allow re-establishment of access to the network upon receipt of the personal identification code without receipt of a user name and/or user password at the time of re-establishment.

In an embodiment, there is provided a hosting system to provide a software-defined network as a service, the system comprising: a cloud exchange co-located with and connected to cloud provider equipment; a non-transitory computer readable medium comprising computer program instructions, the instructions configured to: configure a virtual networking device at the cloud exchange and/or at a customer point of presence, receive a software-defined network specification from a customer of the operator of the system, and create a software-defined network based on the received specification, wherein the software-defined network includes the virtual networking device and connects equipment of the customer to the cloud provider equipment.

In an embodiment, the computer program instructions are further configured to allow the customer to disconnect from the cloud provider and connect to another cloud provider connected to the system. In an embodiment, the computer program instructions are further configured to provide a web portal or an application programming interface to the customer for the customer to configure the network. In an embodiment, the computer program instructions are further configured to allow the customer to include the cloud provider and another cloud provider in the customer's network. In an embodiment, the computer program instructions are further configured to make available a plurality of virtual networking devices for use by the customer and to receive a specification of the network from the customer, wherein the network includes the plurality of virtual networking devices. In an embodiment, the computer program instructions are further configured to interact with a cloud provider application programming interface to connect the software-defined network to the cloud provider equipment and/or to manage network traffic from the software-defined network to the cloud provider equipment. In an embodiment, the computer program instructions are further configured to allow access to the network based upon multi-factor authentication and based upon geolocation information of a token device in relationship to geolocation of a customer's virtual networking device at a customer point of presence. In an embodiment, the computer program instructions are further configured to provide a personal identification code to a token device, wherein the personal identification code is hidden or locked at the token device until authorization information is provided at the token device. In an embodiment, the computer program instructions are further configured to provide a hidden or locked personal identification code and to allow re-establishment of access to the network upon receipt of the personal identification code unhidden or unlocked without receipt of a user name and/or user password at the time of re-establishment. In an embodiment, the computer program instructions are further configured to provide an application programming interface (API), wherein the API allows a method call that merely specifies: a type of the method, a target resource for the method, an identification code for an item of the target resource where the API implements specification of a particular item of the resource in the method call, an identification of an API version where the API implements specification of the API version in the method call, and a body specifying a parameter and/or a value where the API implements specification of a parameter and/or a value in the method call.

In an embodiment, there is provided a method to facilitate a customer of an operator of a system to connect to a cloud provider, the method comprising: facilitating configuration of a software-defined network including a first cloud exchange of the system and/or a second cloud exchange of the system, the network connecting the customer to first cloud provider equipment and/or second cloud provider equipment, wherein the first cloud exchange is co-located with and connected to the first cloud provider equipment, wherein the second cloud exchange is co-located with and a connected to the second cloud provider equipment, the first cloud provider equipment and the second cloud provider equipment being of a same cloud provider but at different geographically spaced locations or the first cloud provider equipment being of a different cloud provider than that of the second cloud provider equipment, and wherein the first cloud exchange is connected to the second cloud exchange.

In an embodiment, the method further comprises providing a web portal or an application programming interface to the customer for the customer to configure the network.

In an embodiment, there is provided a method of providing a software-defined network as a service, the method comprising: configuring a virtual networking device at a customer point of presence and/or a cloud exchange co-located with and connected to cloud provider equipment; receiving a software-defined network specification from a customer of an operator of the cloud exchange and/or customer point of presence, and creating a software-defined network based on the received specification, wherein the software-defined network includes the virtual networking device and connects equipment of the customer to the cloud provider equipment.

In an embodiment, the method further comprises providing an application programming interface to the customer for the customer to configure the network. In an embodiment, the method further comprises allowing the customer to include the cloud provider and another cloud provider in the customer's network. In an embodiment, the method further comprises providing a plurality of virtual networking devices to the customer and to receive a specification of the network from the customer, wherein the network includes the plurality of virtual networking devices. In an embodiment, the method further comprises interacting with a cloud provider application programming interface to connect the software-defined network to the cloud provider equipment and/or to manage network traffic from the software-defined network to the cloud provider equipment. In an embodiment, the method further comprises allowing access to the network based upon multi-factor authentication and based upon geolocation information of a token device in relationship to geolocation of a customer's virtual networking device at a customer point of presence. In an embodiment, the method further comprises providing a personal identification code to a token device, wherein the personal identification code is hidden or locked at the token device until authorization information is provided at the token device. In an embodiment, the method further comprises providing a hidden or locked personal identification code to a user and allowing re-establishment of access to the network upon receipt of the personal identification code unhidden or unlocked without receipt of a user name and/or user password at the time of re-establishment.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A system to facilitate connecting to multiple cloud providers, the system comprising:
   a first cloud exchange configured to provide access to cloud services of a first cloud provider, the first cloud exchange co-located with and connected to first cloud provider physical equipment;
   a second cloud exchange configured to provide access to cloud services of a second cloud provider that is different from the first cloud provider, the second cloud exchange co-located with and connected to second cloud provider physical equipment;
   one or more cloud point-of-presence (PoPs) communicatively coupled to the first and second cloud exchanges, at least one of the one or more cloud PoPs comprising a virtual access gateway for connecting a user device to the first cloud exchange and the second cloud exchange;
   a non-transitory computer readable medium comprising computer program instructions executed by a processor, that, when executed:
   define a software-defined network ("SDN") automation engine that generates an application program interface (API), receives network specification parameters from the user device via the API, and in response to receiving the network specification parameters, instantiates and deploys one or more virtual networking devices to generate a customized, on-demand SDN,
   said customized, on-demand SDN including both the first cloud exchange and the second cloud exchange and comprising a software-based abstraction of a network on physical equipment of said system, and connecting the user device to the first cloud provider physical equipment and the second cloud provider physical equipment, such that the user device accesses a pre-defined combination of cloud services comprising at least one cloud service from each of the first and second cloud providers,
   wherein the network specification parameters include at least one of a user site location, cloud PoP information, user site equipment information, user site connection information and a network topology of the one or more virtual devices; and
   a portal configured to interact with the API and provide a graphical user interface (GUI), the portal configured to receive the network specification parameters from the user device for submission to the SDN automation engine via the GUI.

2. The system of claim 1, wherein the one or more cloud PoPs are configured to provide a private connection for the user device and the one or more cloud PoPs host networking physical equipment dedicated to the user device.

3. The system of claim 1, wherein the one or more cloud PoPs are configured to provide an internet connection to the user device.

4. The system of claim 1, wherein each of the virtual networking devices is configured to provide a networking function used to at least one of switch, route, forward, filter and modify data communications traffic.

5. The system of claim 4, wherein the customized, on-demand SDN comprises a network topology of the one or more of virtual networking devices, at least one of the virtual networking devices comprising a network controller or a gateway.

6. The system of claim 4, wherein at least one of the virtual networking devices is localized in a bare-metal hardware resource of a sub-zone within at least one among the one or more cloud PoPs or within the first cloud exchange and/or second cloud exchange.

7. The system of claim 4, wherein at least one of the virtual networking devices is container based.

8. The system of claim 4, wherein at least two of the one or more virtual networking devices are redundant and on two different sub-zones of the first cloud exchange, of the second cloud exchange and/or of the one or more cloud PoPs.

9. The system of claim 1, comprising the first cloud provider physical equipment and the second cloud provider physical equipment being at different geographically spaced locations.

10. The system of claim 1, wherein the computer program instructions are further configured to allow the user device to switch between the first and second cloud providers.

11. The system of claim 1, wherein the computer program instructions are further configured to allow the user device to create a plurality of software-defined networks, each additional software-defined network of the plurality of software-defined networks including the first cloud exchange and/or second cloud exchange.

12. The system of claim 1, wherein the computer program instructions are further configured to:
receive a software-defined network specification from the user device, the specification comprising an operating parameter associated with the customized, on-demand SDN; and
based on the received specification, newly create the customized, on-demand SDN on a network of physical equipment and/or modify the customized, on-demand SDN on the network of physical equipment, wherein the customized, on-demand SDN includes the one or more virtual networking devices located at the first cloud exchange and/or at the second cloud exchange, the one or more virtual networking devices configured to provide a networking function used to at least one of switch, route, forward, filter and modify data communications traffic.

13. A method to facilitate connecting to multiple cloud providers, the method comprising:
providing a system comprising a software-defined network ("SDN") automation engine, a first cloud exchange, a second cloud exchange and one or more cloud point-of-presence (PoPs) communicatively coupled to the first and second cloud exchanges, the first cloud exchange configured to provide access to cloud services of a first cloud provider, the first cloud exchange co-located with and connected to first cloud provider physical equipment, the second cloud exchange configured to provide access to cloud services of a second cloud provider that is different from the first cloud provider, the second cloud exchange co-located with and connected to second cloud provider physical equipment, at least one of the one or more cloud PoPs comprising a virtual access gateway for connecting a user device to the first cloud exchange and the second cloud exchange;
generating, by the SDN automation engine, an application program interface (API);
receiving, by the SDN automation engine, network specification parameters from the user device via the API;
in response to receiving the network specification parameters, instantiating and deploying, by the SDN automation engine, one or more virtual networking devices to generate a customized, on-demand SDN,
said customized, on-demand SDN including both the first cloud exchange and the second cloud exchange, and
said customized, on-demand SDN connecting the user device to the first cloud provider physical equipment and the second cloud provider physical equipment and comprising a software-based abstraction of a network on physical equipment of said system, such that the user device accesses a pre-defined combination of cloud services comprising at least one cloud service from each of the first and second cloud providers,
wherein the network specification parameters include at least one of a user site location, cloud PoP information, user site equipment information, user site connection information and a network topology of the one or more virtual devices; and
configuring a portal to interact with the API and provide a graphical user interface (GUI), the portal configured to receive the network specification parameters from the user device for submission to the SDN automation engine via the GUI.

14. The method of claim 13, further comprising providing a web portal that interacts with the API and receives input from the user device for configuring the customized, on demand SDN.

15. The method of claim 13, further comprising:
receiving a software-defined network specification from the user device, the specification comprising an operating parameter associated with the customized, on-demand SDN; and
based on the received specification, newly creating the customized, on-demand SDN on a network of physical equipment and/or modifying the customized, on-demand SDN on the network of physical equipment, wherein the customized, on-demand SDN includes the one or more virtual networking devices located at the first cloud exchange and/or at the second cloud exchange, the one or more virtual networking devices configured to provide a networking function used to switch, route, forward, filter, modify, or any combination selected therefrom, data communications traffic.

16. A non-transitory computer readable medium comprising computer program instructions, the instructions when executed by a computer processor system are configured to:
configure each of a first cloud exchange, a second cloud exchange and one or more cloud point-of-presence (PoPs) communicatively coupled to the first and second cloud exchanges, the first cloud exchange configured to provide access to cloud services of a first cloud provider, the first cloud exchange co-located with and connected to first cloud provider physical equipment, the second cloud exchange configured to provide access to cloud services of a second cloud provider that is different from the first cloud provider, the second cloud exchange co-located with and connected to second cloud provider physical equipment, at least one of the one or more cloud PoPs comprising a virtual access gateway for connecting a user device to the first cloud exchange and the second cloud exchange;
define a software-defined network ("SDN") automation engine that generates an application program interface (API);

receive, by the SDN automation engine, network specification parameters from the user device via the API;

in response to receiving the network specification parameters, instantiate and deploy, by the SDN automation engine, one or more virtual networking devices to generate a customized, on-demand SDN, said customized, on-demand SDN including both the first cloud exchange and the second cloud exchange and comprising a software-based abstraction of a network on physical equipment of said system, and said customized, on-demand SDN connecting the user device to the first cloud provider physical equipment and the second cloud provider physical equipment, such that the user device accesses a pre-defined combination of cloud services comprising at least one cloud service from each of the first and second cloud providers, wherein the network specification parameters include at least one of a user site location, cloud PoP information, user site equipment information, user site connection information and a network topology of the one or more virtual devices; and a portal configured to interact with the API and provide a graphical user interface (GUI), the portal configured to receive the network specification parameters from the user device for submission to the SDN automation engine via the GUI.

17. The medium of claim 16, wherein the computer program instructions are further configured to enable the user device to switch between the first and second cloud providers.

18. The system of claim 1, wherein:
at least one of the first cloud exchange and the second cloud exchange provides access to a plurality of cloud providers, each cloud provider separate from the other, and the customized, on-demand SDN provides access to cloud services from among two or more different cloud providers among the plurality of cloud providers.

19. The method of claim 13, wherein the first cloud provider physical equipment and the second cloud provider physical equipment are located at different geographically spaced locations.

20. The method of claim 13, wherein:
at least one of the first cloud exchange and the second cloud exchange provides access to a plurality of cloud providers, each cloud provider separate from the other, and the customized, on-demand SDN provides access to cloud services from among two or more different cloud providers among the plurality of cloud providers.

* * * * *